United States Patent
Synnergren et al.

(10) Patent No.: US 10,097,460 B2
(45) Date of Patent: Oct. 9, 2018

(54) ROUTING IN AN COMMUNICATIONS NETWORK HAVING A DISTRIBUTED S/PGW ARCHITECTURE

(71) Applicant: Telefonaktiebolaget LM Ericsson (publ), Stockholm (SE)

(72) Inventors: Per Synnergren, Gammelstad (SE); Johan Kristiansson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/517,879

(22) PCT Filed: Oct. 7, 2014

(86) PCT No.: PCT/SE2014/051165
§ 371 (c)(1),
(2) Date: Apr. 7, 2017

(87) PCT Pub. No.: WO2016/056957
PCT Pub. Date: Apr. 14, 2016

(65) Prior Publication Data
US 2017/0310592 A1    Oct. 26, 2017

(51) Int. Cl.
*H04L 12/743* (2013.01)
*H04L 12/741* (2013.01)
(Continued)

(52) U.S. Cl.
CPC .......... *H04L 45/7453* (2013.01); *H04L 45/38* (2013.01); *H04L 45/54* (2013.01); *H04W 88/16* (2013.01)

(58) Field of Classification Search
CPC ..... H04L 45/7453; H04L 45/38; H04L 45/54; H04L 61/2061; H04L 29/08; H04L 29/12;
(Continued)

(56) References Cited

U.S. PATENT DOCUMENTS

| 2009/0282048 A1 | 11/2009 | Ransom et al. |
| 2013/0198332 A1* | 8/2013 | Van Ackere ...... H04L 29/12018 709/217 |
| 2016/0197831 A1* | 7/2016 | De Foy ............... H04L 45/7453 370/392 |

FOREIGN PATENT DOCUMENTS

EP    1655928 A1    5/2006

OTHER PUBLICATIONS

3GPP TS 23.401 version 12.6.0 (Release 12), "General Packet Radio Service (GPRS) enhancements for Evolved Universal Terrestrial Radio Access Network (E-UTRAN) access", ETSI TS 123 401 V12.6.0 (Sep. 2014), 308 pages.
(Continued)

*Primary Examiner* — Eric A Myers
(74) *Attorney, Agent, or Firm* — Nicholson De Vos Webster & Elliott, LLP

(57) ABSTRACT

A non-transitory computer readable medium has instructions stored therein to be executed by a packet processing unit (PPU) in a communications network to allow a plurality of PPUs in the communication network to route data packets. The plurality of PPUs collectively maintain a distributed hash table (DHT). The DHT stores a distributed routing table (DRT), where the DRT includes a DRT entry that maps a key to a value. The key is based on a destination Internet Protocol (IP) address and an access point name (APN) associated with an IP session of a user entity (UE). The value represents both an IP address of one of the plurality of PPUs currently serving the IP session of the UE and an IP session identifier that identifies, to that PPU currently serving the IP session of the UE, the IP session of the UE.

21 Claims, 18 Drawing Sheets

(51) Int. Cl.
    *H04L 12/721*    (2013.01)
    *H04W 88/16*    (2009.01)
(58) Field of Classification Search
    CPC .... H04L 61/2015; H04W 88/16; H04W 8/26;
                                              G06F 11/00
    See application file for complete search history.

(56) References Cited

OTHER PUBLICATIONS

3GPP TS 23.402 version 12.6.0 ( Release 12), "Universal Mobile Telecommunications System (UMTS); Architecture enhancements for non-3GPP accesses", ETSI TS 123 402 V12.6.0 (Sep. 2014), 290 pages.
3GPP TS 29.061 version 11.7.0 (Release 11), "Interworking between the Public Land Mobile Network (PLMN) supporting packet based services and Packet Data Networks (PDN); Digital cellular telecommunications system (Phase 2+); Universal Mobile Telecommunications System (UMTS)" ETSI TS 129 061 V11.7.0 (Jul. 2014), 165 pages.
3GPP TS 29.274 version 11.11.0, "3GPP Evolved Packet System (EPS); Evolved General Packet Radio Service (GPRS) Tunnelling Protocol for Control plane (GTPv2-C) Universal Mobile Telecommunications System (UMTS)" Release 11, ETSI TS 129 274 V11.11.0 (Jul. 2014), 234 pages.
3GPP TS 29.281 version 11.6.0, "General Packet Radio System (GPRS) Tunnelling Protocol User Plane (GTPv1-U); Universal Mobile Telecommunications System (UMTS)", Release 11, ETSI TS 129 281 V11.6.0 (Apr. 2013), 29 pages.
Demers, et al., "Epidemic algorithms for replicated database maintenance", Association of Computing Machinery, Xerox Corporation, Palo Alto Research Center, CSL-89-1, Jan. 1989, 28 pages.
Fischer, et al., "A Distributed IP Mobility Approach for 3G SAE", IEEE, 2008, 6 pages.
Hahn, "Flat 3GPP Evolved Packet Core; Improvement for multiple network connections", 14th International Symposium on Wireless Personal Multimedia Communications (WPMC), 2011, 5 pages.
Hamilton, "Files Systems, Physical View (Disk Allocation Methods)" University of Regina, Professor Hamilton's course notes downloaded from http://www2.cs.uregina.ca/~hamilton/courses/330/notes/allocate/allocate.html on Oct. 3, 2014, 9 pages.
International Search Report and the Written Opinion of the International Searching Authority from counterpart PCT Application No. PCT/SE2014/051165, dated Feb. 16, 2015, 12 pages.
International Search Report and the Written Opinion of the International Searching Authority from counterpart PCT Application No. PCT/SE2014/051166, dated Jun. 3, 2015, 9 pages.

Kaashoek, et al., "Koorde: A Simple Degree-Optimal Distributed Hash Table" Peer-to-Peer Systems II, vol. 2735, 2003, 6 pages.
Katanekwa, et al., "Enhanced Gateway Selection for Optimal Routing in a Distributed Evolved Packet Core (EPC) Network," 10th International Conference on Electrical Engineering/Electronics, Computer, Telecommunications and Information Technology (ECTI-CON), 2013, 6 pages.
Liang, et al., "Understanding KaZaA", 2004, 7 pages.
Maymounkov, et al., "Kademlia: A Peer-to-Peer Information System Based on the XOR Metric," Proceeding of IPTPS '01 Revised Papers from the First International Workshop on Peer-to-Peer Systems, 2002, p. 53-65.
Pinakoulakis, et al., "Anchor-less Network Architecture Using P2P and DHT" Master Thesis, KTH Royal Institute of Technology, Nov. 4, 2013, 86 pages.
RFC 3633: Troan, et al., "IPv6 Prefix Options for Dynamic Host Configuration Protocol (DHCP) version 6," The Internet Society, Network Working Group, Request for Comments, Dec. 2003, 19 pages.
Rowstron, et al., "Pastry: Scalable, decentralized object location and routing for large-scale peer-to-peer systems" Proc. of the 18th IFIP/ACM International Conference on Distributed Systems Platforms, 2001, 22 pages.
Stoica, et al., "Chord: A Scalable Peer-to-peer Lookup Service for Internet Applications," SIGCOMM'01, Aug. 27-31, 2001, 12 pages.
Tanenbaum, et al., "Modern Operating Systems," 2007, 3rd Edition, details downloaded from https://www.amazon.com/Modern-Operating-Systems-3rd-Edition/dp/0136006639 on Oct. 3, 2014, 5 pages.
"The Apache Cassandra Project," downloaded from http://cassandra.apache.org/ on Oct. 3, 2014, 2 pages.
Wikipedia, "Free list", available at https://en.wikipedia.org/wiki/Free_list, downloaded from https://web.archive.org/web/20140922092635/http://en.wikipedia.org/wiki/Free_list, last modification May 19, 2014, 1 page.
Wikipedia, "Buddy Memory Allocation", downloaded from http://en.wikipedia.org/wiki/Buddy_memory_allocation on Oct. 3, 2014, 5 pages.
Wikipedia, "Consensus (Computer Science)," downloaded from http://en.wikipedia.org/wiki/Consensus_computer_science) on Oct. 3, 2014, 7 pages.
Wikipedia, "Gnutella", downloaded from http://en.wikipedia.org/wiki/Gnutella on Oct. 3, 2014, 5 pages.
Wikipedia, "Gossip Protocol", downloaded from http://en.wikipedia.org/wiki/Gossip_protocol on Oct. 3, 2014, 7 pages.
Wu, et al., "Experience Implementing an IP Address Closure," 20th Large Installation System Administration Conference (LISA '06), pp. 119-130.
Zhao, et al., "Tapestry: A Resilient Global-Scale Overlay for Service Deployment" IEEE Journal on Selected Areas in Communications, Jan. 2004, vol. 22 (1), pp. 41-53.

* cited by examiner

| Key (202) | Value (204) |
|---|---|
| Internet APN + Internet IP Address of UE A | IP Address of PPU A + TEID W |
| IMS APN + IMS IP Address of UE A | IP Address of PPU A + TEID X |
| LBO APN + LBO IP Address of UE A | IP Address of PPU A + TEID Y |
| ... | ... |
| Internet APN + * | IP Address of PPU D + Default TEID for Internet APN |
| IMS APN + * | IP Address of PPU D + Default TEID for IMS APN |
| LBO APN + LBO IP Address of UE B | IP Address of PPU B + TEID Z |

ROUTING IN AN COMMUNICATIONS NETWORK HAVING A DISTRIBUTED S/PGW ARCHITECTURE

RELATED APPLICATIONS

This application is a national stage of International Application No. PCT/SE2014/051165, filed Oct. 7, 2014, which is incorporated herein by reference. Cross-reference is made to U.S. Application No. 15/517,876, entitled "Distributed IP Allocation and De-Allocation Mechanism in a Communications Network Having a Distributed S/PGW Architecture" which is a national stage of International Application No. PCT/SE2014/051166, filed Oct. 7, 2014, and commonly owned. The cross-referenced application is incorporated herein by reference.

TECHNICAL FIELD

The present disclosure relates to routing in a communications network. More specifically, the present disclosure relates to a shared distributed routing table in a communications network having a distributed S/PGW architecture.

BACKGROUND

The Evolved Packet Core (EPC) is an all-IP mobile core network for the Long Term Evolution (LTE) wireless communication standard. The Third Generation Partnership Project (3GPP) has standardized the EPC starting from release 8. Most 4G mobile broadband (MBB) radio access networks (RANs) and some 3G RANs are supported by an EPC core network to provide end-to-end MBB service.

A typical EPC network deploys Packet Data Network Gateways (PDN-GW or PGW) at a few centrally located data centers. Typically, operators deploy PGWs in the same physical sites at which the operators access their Internet peering points, or in locations with reliable access to sites with Internet peering. This deployment model is quite effective for today's network traffic, in which the absolute majority of packets are addressed to/from the Internet and thus go through the Internet peering point. For more detail on EPC and PGW functions, see 3GPP TS 23.401 and 23.402.

An increasing share of network traffic is related to the enterprise and automation industry segments. Enterprise and industry segment users may want to deploy networks in which the data is locally terminated and sent only locally (e.g., between a sensor and a server) without accessing the Internet peering point. Locally terminated data may provide more security and increase delay performance (that is, reduce delay). As such, locally terminated data may also improve human-to-human communication, especially for delay sensitive applications such as real-time gaming applications. The current EPC network architecture that builds a hierarchy of serving gateways (SGWs) and PGWs may not be suitable for efficiently processing locally terminated data.

SUMMARY

A non-transitory computer readable medium has instructions stored therein to be executed by a packet processing unit (PPU) in a communications network to allow a plurality of PPUs in the communication network to route data packets. The plurality of PPUs in the communications network collectively maintain a distributed hash table (DHT). The DHT stores a distributed routing table (DRT), where the DRT includes a DRT entry that maps a key to a value. The key of the DRT entry is based on both a destination Internet Protocol (IP) address and an access point name (APN) associated with an IP session of a user entity (UE). The value of the DRT entry represents both an IP address of one of the plurality of PPUs currently serving the IP session of the UE and an IP session identifier that identifies, to that PPU currently serving the IP session of the UE, the IP session of the UE. The execution causes the PPU to perform a set of operations including, receiving a data packet addressed to the destination IP address and the APN associated with the IP session of the UE, determining, based on the destination IP address and the APN associated with the IP session of the UE, the key for the DRT entry, looking up, using a DHT algorithm and based on the determined key, which of the plurality of PPUs is responsible for storing the DRT entry in the DHT, accessing from the PPU responsible for storing the DRT entry in the DHT, the value of the DRT entry, and tunneling the data packet to the IP address of the PPU currently serving the IP session of the UE using the IP session identifier based on the value.

A method is performed by a packet processing unit (PPU) in a communications network to allow a plurality of PPUs in the communications network to route data packets. The plurality of PPUs in the communications network collectively maintain a distributed hash table (DHT). The DHT stores a distributed routing table (DRT), where the DRT includes a DRT entry that maps a key to a value. The key of the DRT entry is based on both a destination Internet Protocol (IP) address and an access point name (APN) associated with an IP session of a user entity (UE). The value of the DRT entry represents both an IP address of one of the plurality of PPUs currently serving the IP session of the UE and an IP session identifier that identifies, to that PPU currently serving the IP session of the UE, the IP session of the UE. The method receives a data packet addressed to the destination IP address and the APN associated with the IP session of the UE. The method determines, based on the destination IP address and the APN associated with the IP session of the UE, the key for the DRT entry. The method looks up, using a DHT algorithm and based on the determined key, which of the plurality of PPUs is responsible for storing the DRT entry in the DHT. The method accesses, from the PPU responsible for storing the DRT entry in the DHT, the value of the DRT entry. The method tunnels the data packet to the IP address of the PPU currently serving the IP session of the UE using the IP session identifier based on the value.

A network device is configured to function as a packet processing unit (PPU) in a communications network to allow a plurality of PPUs in the communications network to route data packets. The plurality of PPUs in the communications network collectively maintain a distributed hash table (DHT). The DHT stores a distributed routing table (DRT), where the DRT includes a DRT entry that maps a key to a value. The key of the DRT entry is based on both a destination Internet Protocol (IP) address and an access point name (APN) associated with an IP session of a user entity (UE). The value of the DRT entry represents both an IP address of one of the plurality of PPUs currently serving the IP session of the UE and an IP session identifier that identifies, to that PPU currently serving the IP session of the UE, the IP session of the UE. The network device includes a processor and a memory. The memory contains instructions executable by the processor whereby the network device is operative to receive a data packet addressed to the destination IP address and the APN associated with the IP session of the UE. The memory contains further instructions executable by the processor to determine, based on the destination IP address and the APN associated with the IP session of the UE, the key for the DRT entry. The memory contains further instructions executable by the processor to look up, using a DHT algorithm and based on the determined key, which of the plurality of PPUs is responsible for storing the DRT entry in the DHT. The memory contains further instructions executable by the processor to access, from the PPU responsible for storing the DRT entry in the DHT, the value of the DRT entry. The memory contains further instructions executable by the processor to tunnel the data packet to the IP address of the PPU currently serving the IP session of the UE using the IP session identifier based on the value.

BRIEF DESCRIPTION OF THE DRAWINGS

Aspects of the present disclosure are illustrated by way of example and are not limited by the accompanying drawings. In the drawings:

FIG. 2 is a diagram of an exemplary routing table that can be used by PPUs for routing data packets in an EPC network having a distributed S/PGW architecture;

DETAILED DESCRIPTION

Figure 1:
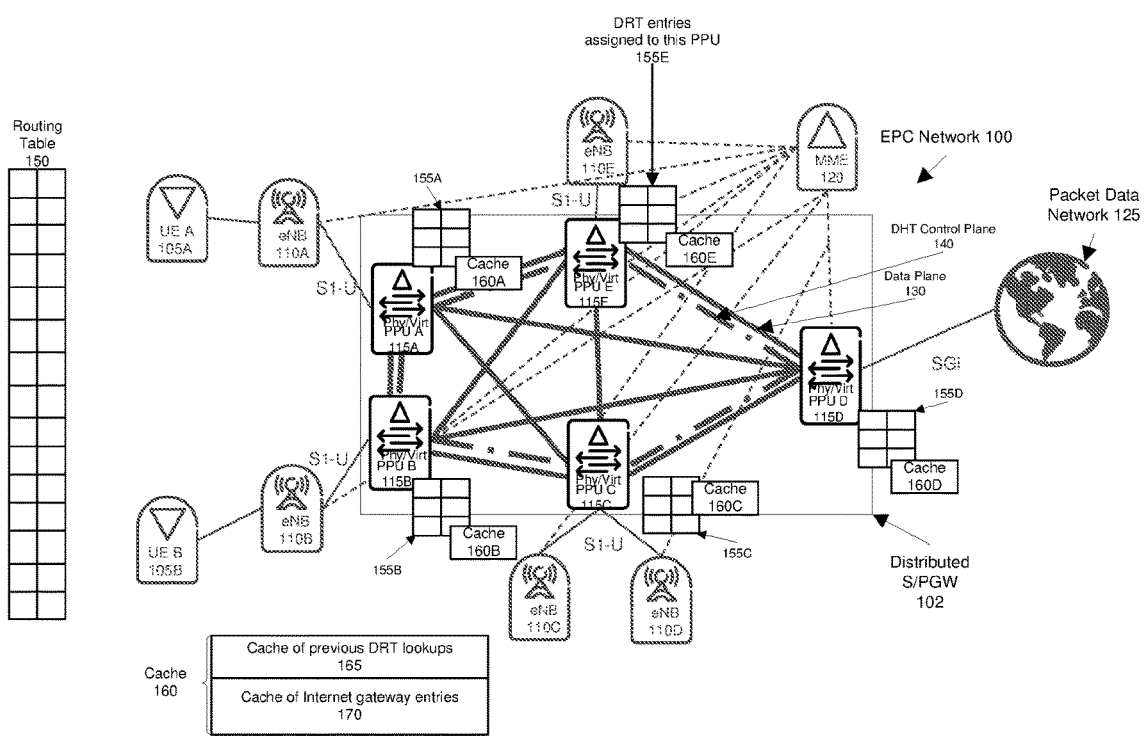
FIG. 1 is a diagram of one embodiment of an EPC network having a distributed S/PGW architecture.

The following description describes methods, systems, and apparatus to support routing of data packets in a communications network having a distributed Serving and Packet Data Network Gateway (S/PGW) architecture. While the invention will be described in the context of an Evolved Packet Core (EPC) network, it will be apparent to one of ordinary skill in the art that the invention may be deployed in other all-IP mobile core communications networks. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, the singular forms "a," "an," and "the" are intended to include the plural forms as well, unless the context clearly indicates otherwise. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, elements, steps, components or functions but does not preclude the presence or addition of one or more other features, elements, steps, components, functions or groups thereof.

Some embodiments are disclosed in the context of an example EPC network having a distributed S/PGW architecture as shown in FIG. 1. An overview of the EPC network of FIG. 1 is initially provided, and then various diagrams of operations according to embodiments disclosed herein are explained in the context of the EPC network of FIG. 1. However, it should be understood that the operations of diagrams can be performed by embodiments of the invention other than those discussed with reference to FIG. 1, and the embodiments discussed with reference to FIG. 1 can perform operations different than those discussed with reference to the flow diagrams.

FIG. 1 is a diagram of one embodiment of an EPC network having a distributed S/PGW architecture. The example EPC network 100 includes a set of user entities (UEs) 105A-E that communicates through radio access communication with an eNodeB (eNB) 110A-E. A UE 105 can be any type of stationary or mobile device including cellular phone, tablet computer, laptop, desktop, console device, sensor, or similar electronic device that can connect to the EPC network 100 via an eNB 110. For clarity, the example network shows a single UE 105 connecting to an eNB 110. However, more than one UE 105 may be connected to an eNB 110 at a given time. The example EPC network 100 also includes a set of physical or virtual packet processing units (PPUs) 115A-E that form a distributed S/PGW 102. Any number of PPUs 115 can form the distributed S/PGW 102. The distributed S/PGW 102 can perform packet routing, mobility management of UEs 105, IP address allocation, and other functions traditionally performed by Serving Gateways (SGWs) and/or Packet Data Network Gateways (PGWs). Each PPU 115 of the distributed S/PGW 102 may communicate with other PPUs 115 to exchange control information over a control plane 140 and to forward data over a data plane 130. The eNBs 110 are communicatively coupled to one or more PPUs 115 via an S1-U interface (see 3GPP TS 29.281) to provide UEs 105 with access to the distributed S/PGW 102. The PPU 115 that a UE 105 is currently using to connect to the EPC network 100 will be referred to herein as the serving PPU for the UE 105. For example, in the EPC network 100 of FIG. 1, PPU 115A is currently a serving PPU for UE 105A, and PPU 115B is currently a serving PPU for UE 105B. Some PPUs 115 such as PPU 115D are connected to a packet data network (PDN) 125 (e.g., the Internet) via an SGi interface (see 3GPP TS 29.061). The PPUs 115 and the eNBs 110 can communicate with a Mobility Management Entity (MME) 120. The MME 120 performs control functions related to subscriber and session management. For example, the MME 120 can manage the assignment of network resources, attachment of UEs 105 to the EPC network 100, and handover of UEs 105 between PPUs 115. The eNB 110 constitutes the radio access network (RAN) portion of the network, while the distributed S/PGW 102 and the MME 120 constitute the packet core portion of the network.

Unlike traditional EPC networks that include a single one or build a hierarchy of Serving Gateways (SGW) and Packet Data Network Gateways (PGW) (network of sub-networks), a distributed S/PGW architecture implements a flat topology where each PPU 115 of the distributed S/PGW 102 is connected to the same IP network, but still acting as independent routers. The PPUs 115 share the same routing table 150, which indicates to the PPUs how to forward/route a data packet to its destination. In one embodiment, the routing table 150 includes information that indicates which PPUs 115 are currently serving which UEs 105. When a UE 105 attaches, detaches, or experiences inter-PPU handover, the routing table is updated to reflect these events. This allows the PPUs 115 of the distributed S/PGW 102 to support routing of locally terminated data.

In one embodiment, the routing table 150 can be distributively stored and maintained by the PPUs 115 of the distributed S/PGW 102 using a distributed hash table (DHT). As is well-known to one having ordinary skill in the art, a DHT provides a decentralized/distributed system that provides a lookup service. Key-value pairs are stored in the DHT, and any node participating in the DHT can efficiently retrieve the value corresponding to a given key. While in one embodiment the Chord DHT protocol is used to establish and maintain the DHT (see Stoica, Ion, et al., Chord: *A Scalable Peer-to-Peer Lookup Service for Internet Applications*, ACM SIGCOMM Computer Communication Review. Vol. 31. No. 4. ACM, 2001), alternative embodiments of the invention can use other suitable DHT protocols such as Pastry, Tapestry, and Kademlia (see Rowstron, Antony, et al., *Pastry: Scalable, Decentralized Object Location and Routing for Large-scale Peer-to-peer Systems,* $18^{th}$ IFIP/ACM International Conference on Distributed Systems Platforms (Middleware 2001). Heidelberg, Germany, November 2001; see Zhao, Ben Y., et al., *Tapestry: A Resilient Global-Scale Overlay for Service Deployment*, IEEE Journal on Selected Areas in Communication. Vol. 22. No. 1. January 2004; see Maymounkov, Petar, et al., *Kademlia: A Peer-to-peer Information System Based on the XOR Metric*, IPTPS 2001 Revised Papers from the First International Workshop on Peer-to-peer Systems. 2001).

In one embodiment, each PPU 115 that forms the distributed S/PGW 102 participates as a node in a DHT. Thus, the PPUs 115 of the distributed S/PGW 102 collectively maintain the DHT. In one embodiment, each of the routing table entries are key-value pairs (e.g., see FIG. 2) that are distributively stored among the PPUs according to a DHT protocol. A routing table 150 that is distributively stored using a DHT will be referred to herein as a distributed routing table (DRT). As used herein, a DRT entry refers to a mapping of a key of the DRT to a corresponding value. In one embodiment, other logical tables can be stored on the same DHT structure that stores the DRT. If other logical tables are stored on the same DHT structure as the DRT, the entries for the DRT can be differentiated by adding a prefix to the keys. For example, the string "DRT" can be added to DRT keys.

Conceptually, the DHT partitions the routing table 150 into pieces such that PPUs 115 participating as a node in the DHT are responsible for storing a portion of the routing table. For example, in the exemplary EPC network 100, PPU 115E has been assigned DRT entries 155E and PPU 115A has been assigned DRT entries 155A. In this manner, each of the DRT entries is typically stored in only one of the PPUs at a time (except backup copies of DRT entries as discussed herein below). While FIG. 1 shows that each of the PPUs 115 are responsible for storing an equal amount of entries, it is possible (and likely) that not all PPUs 115 will be assigned the same number of entries. In one embodiment, a PPU 115 can store DRT entries assigned to itself 155 using a data structure that allows for fast and efficient look up based on the key as described later herein. In one embodiment, the DHT protocol determines which PPU 115 is responsible for storing a particular key-value pair based on a hash value of the key. This can be done by using consistent hashing and assigning each PPU 115 an ID (e.g., a self-generated ID) that is in the same hash space as the one used to calculate the hash value of the keys. Each PPU 115 is then responsible for storing key-value pairs having a hash value of the key that is closest to the PPU's ID compared to other PPUs 115 participating in the DHT (e.g., see Chord DHT protocol mentioned above). In one embodiment, the DHT protocol defines a distance metric that provides an abstract notion of distance between hash values (and node IDs) and this distance metric is used as part of determining which PPU 115 is responsible for storing a particular key-value pair.

In one embodiment, a PPU 115 can join the DHT by generating an ID for itself that is in the same hash space as the one used to calculate the hash value of the keys. The PPU 115 can contact any other DHT nodes (i.e., PPUs) in the DHT network and ask them to become part of the DHT. In Chord DHT this is done by asking any existing DHT node to look up the ID of the new node itself to find out where in the ring the new node should be added (i.e., finding the successor of the new node ID in the ring). During a stabilization period, the PPU 115 will take over responsibility for some of the key-value pairs according to the DHT protocol (e.g., see Chord DHT protocol mentioned above). It is to be noted that a PPU's 115 closest neighbor in the DHT is not necessarily the geographically closest PPU 115. Rather, the closest neighbor in the DHT may be determined based on a PPU's 115 position in a DHT overlay network (e.g., based on PPU ID).

In one embodiment, the DRT entries stored at a PPU 115 are replicated (not shown) at the PPU's 115 closest neighbors (that is, a backup copy) to provide better robustness and to prevent entries from being lost when a PPU 115 leaves the DHT. If a PPU 115 unexpectedly leaves the DHT, its responsibilities will be automatically taken over by some other PPUs 115 in the DHT. This self-organizing and self-healing aspect of the DHT makes it possible to dynamically add or remove PPUs 115 to the core network in a plug-and-play fashion. This feature may be useful in cases where capacity or coverage must be increased quickly (e.g., see Chord DHT protocol mentioned above). When a DRT entry is changed (i.e., added, deleted, or updated), it is important that all backup copies of the entry are changed atomically in a single operation. Otherwise, the backup copies can become inconsistent with the original entry. In one embodiment, a two-phase commit protocol can be used to ensure that all backup copies are changed atomically.

In some embodiments, each PPU 115 maintains a cache of previous DRT lookups 165. In such an embodiment, only the first lookup of a particular DRT entry requires querying the DRT, and any subsequent lookups for that DRT entry while that DRT entry is stored in the cache will be sourced from the cache 160, thus reducing the delays associated with DHT lookups. In one embodiment, each PPU 115 also maintains a cache of Internet gateway entries 170. In such an embodiment, all DRT entries to PPUs acting as gateways to the Internet are cached. This allows PPUs to forward/route data packets that are destined for the Internet without having to perform a DHT lookup. Internet gateway entries are good candidates for caching because these entries are relatively static as the PPUs acting as gateways to the Internet usually have a physical connection to the Internet. While the following flow diagrams are described with reference to an embodiment that uses caches 160 as illustrated in FIG. 1, alternative embodiments do not implement the cache of previous lookup of DRT entries 165 and/or the cache of Internet gateway entries 170. In one embodiment, as discussed above, the DRT provides information about which PPUs 115 are currently serving which UEs 105. As such, PPUs can use the routing table to forward/route data packets to a UE 105 that is currently served by one of the PPUs 115 of the distributed S/PGW 102, thus allowing for routing of locally terminated data without going through a PGW. At the same time, the DRT can also provide information on how to forward/route data packets destined for the Internet.

FIG. 2 is an exemplary routing table 150 that stores entries as key-value pairs for fast and efficient search based on the key. Each entry in the exemplary routing table 150 maps a key 202 to a corresponding value 204. The first column of the routing table 150 illustrates a key 202 and the second column illustrates the corresponding value 204. In one embodiment, the key is based on both a destination IP address and an access point name (APN) for which the destination IP address is valid. In one embodiment, the corresponding value represents both an IP address of one of the PPUs 115 and an IP session identifier that can be used to reach the IP address and APN of the key. The exemplary routing table 150 uses a tunnel endpoint identifier (TED) as an IP session identifier. A TEID is used throughout this document as an example of an IP session identifier. However, it should be noted that other types of identifiers can be used to identify an IP session. As used herein, an IP session refers to an IP address and APN allocation. In one embodiment, the routing table 150 stores entries for at least the IP addresses and APNs of IP sessions of UEs 105 that are currently served by the PPUs 115 of the distributed S/PGW 102. In one embodiment, the routing table 150 will also store one or more entries for IP addresses that are outside the range of IP addresses that are local to the EPC network 100. The key for such an entry can be based on both an identifier that represents all IP addresses outside of the range of IP addresses that are local to the EPC network 100 and an APN. While in one embodiment the identifier that represents all IP addresses outside of the range of IP addresses that are local to the EPC network 100 is "*", other embodiments may use any other symbol, text, number, or combination thereof.

If the key is based on an IP address and APN associated with an IP session of a UE 105, then the corresponding value represents the IP address of the PPU 115 that is currently serving the IP session of the UE 105 and the TEID that identifies to that PPU 115 currently serving the IP session of the UE 105, the IP session of the UE 105. For example, entry 206 in the routing table 150 has a key that is based on an IP address and APN that is associated with an Internet IP session of UE A 105A. The corresponding value of entry 206 represents an IP address of a PPU 115 that is currently serving the Internet IP session of UE A 105A (i.e., PPU A 115A) and a TEID that can be used to reach the Internet IP session of UE A 105A (i.e., TED W). If the key is based on an identifier that represents all IP addresses outside of the range of IP addresses that are local to the EPC network 100 (e.g., "*") and an APN, then the corresponding value represents the IP address of a PPU 115 that has peering to a PDN associated with the APN and a default TED for the APN that identifies to the PPU 115 with peering to the PDN, the PDN associated with the APN. For example, entry 212 in the routing table 200 has a key that is based on an identifier that represents all IP addresses outside of the range of IP addresses that are local to the EPC network 100 ("*") and an APN (Internet APN). The corresponding value of entry 212 represents an IP address of a PPU 115 that has peering to the PDN associated with the Internet APN (i.e., PPU D 115D) and a default TEID that can be used to reach the Internet PDN 125 (default TED for Internet APN).

While FIG. 2 illustrates the routing table 150 as having two columns, it should be understood that in some embodiments, PPUs may use different types of data structures to store entries that they are responsible for (e.g., an array, a priority sorted list, key sorted array, self-balancing binary search tree, hash table); thus, the language key-value pair and a key mapped to a value may refer to a mapping that is stored in any such data structure, including a data structure that uses the key to index an entry in the data structure (i.e., a key may be generated and its value used to locate the entry) and need not store the key itself.

Figure 3:
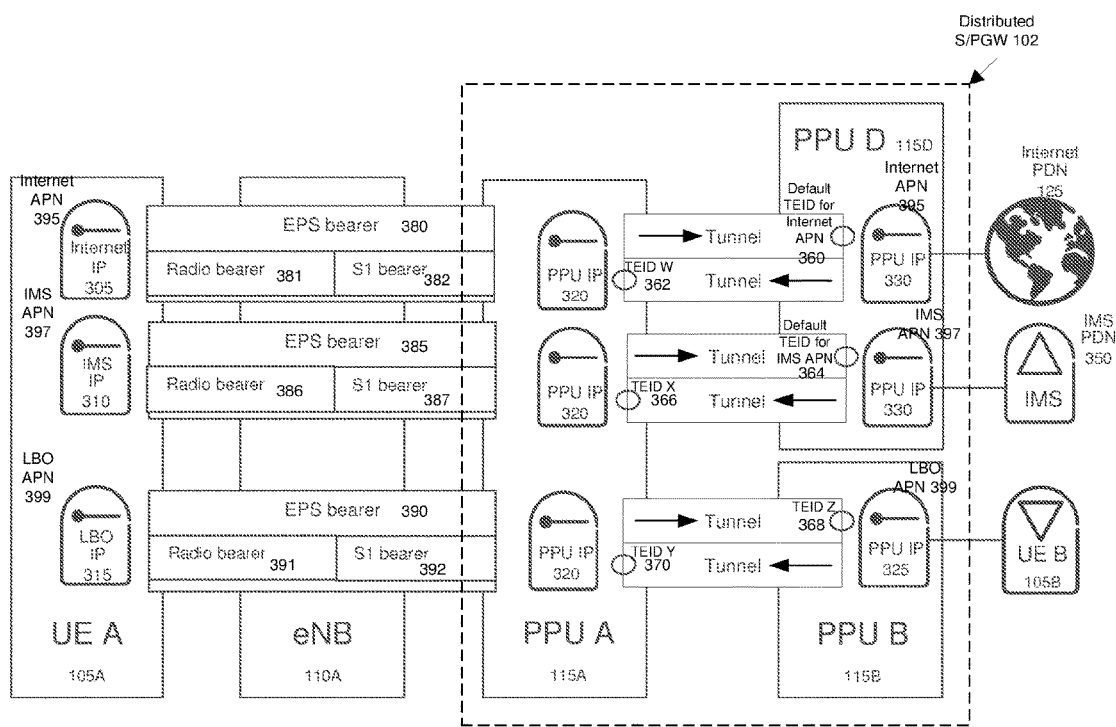
FIG. 3 is a diagram illustrating the role of APNs and TEIDs for routing in an EPC network having a distributed S/PGW architecture.

FIG. 3 is a diagram illustrating the role of APNs and TEIDs for routing in an EPC network having a distributed S/PGW architecture.

UE A 105A is currently served by PPU A 115A via an eNB 110A. UE A 105A is connected to three different APNs: an Internet APN, an IP Multimedia Subsystem (IMS) APN, and a local breakout (LBO) APN. UE A 105 is allocated an Internet IP address 305 for the Internet APN connection, an IMS IP address 310 for the IMS APN connection, and a LBO IP address 315 for the LBO APN connection. Each of the IP sessions have established an EPS bearer 380, 385, 390 connection to PPU A 115A. Each EPS bearer connection 380, 385, 390 can include a radio bearer portion 381, 386, 391 (between UE A and the eNB) and an S1 bearer portion 382, 387, 392 (between the eNB and PPU A). Different APNs can share the same private IP address space and thus it is possible that the same IP address (for different APNs) is allocated to two different UEs 105. It is also possible that the same IP address could be allocated to more than one IP session within a single UE 105. Including the APN as part of the key in the DRT allows each of the APNs to reuse the same private IP address space, and not require each APN to have its own separate IP address space. For example, the same IP address, 10.0.0.1, can be assigned to two different UEs 105 but for different APNs, and the DRT can differentiate entries for this IP address (there will be two entries for this IP address) based on the APN.

UE B 105B is currently served by PPU B 115B and is connected to the LBO APN 399. UE B 105B is allocated an LBO IP address for the LBO APN 399. For simplicity and clarity, the eNB that UE B 105B uses to connect to PPU B 115B and the EPS bearer connection between UE B 105B and PPU B 115B is not shown in the diagram.

PPU D 115D is a PPU 115 with peering to the Internet. PPU D 115D is connected to two external PDNs: an Internet PDN 125 and an IMS PDN 350. The Internet PDN 125 is associated with the Internet APN 395 and the IMS PDN 350 is associated with the IMS APN 397.

PPUs can forward/route data packets to their destinations by consulting a routing table such as the exemplary routing table 150 described above with reference to FIG. 2. For example, UE B 105B can generate a data packet addressed to UE A's LBO IP address 315 associated with the LBO APN 399. UE B 105B sends this data packet to its serving PPU (i.e., PPU B 115B). PPU B 115B receives the data packet and performs a lookup in the routing table 150 to determine how to route the data packet. PPU B 115B looks up the relevant entry in the routing table 150 using a key that is based on the destination APN and IP address of the data packet (in one embodiment, this relevant entry was generated by PPU A 115A as described later herein). Since the data packet is addressed to UE A's LBO IP address 315 associated with the LBO APN 399, the relevant DRT entry (in the exemplary routing table illustrated in FIG. 2) is entry 210. PPU B 115B then retrieves the corresponding value of the relevant DRT entry 210. The corresponding value represents the IP address of the PPU 115 that is currently serving the IP session (that is associated with the IP address and APN of the key) and a TEID that identifies, to that PPU 115, that IP session. In this example, the corresponding value indicates that PPU A 115A is currently serving the IP session and that TED Y 370 should be used to tunnel the data packet. PPU B 115B then tunnels the data packet to the IP address of PPU A 115A using TEID Y 370. TED Y 370 uniquely identifies to PPU A 115A, that the data packet belongs to the LBO IP session. Upon receiving the data packet, PPU A 115A can route the data packet to UE A's 105A LBO IP session based on the TEID. Thus, even if UE A 105A is connected to multiple APNs using the same IP address, the TED allows PPU A 115A to uniquely identify the correct APN connection on which to route the data packet.

As another example, UE A 105A can generate a data packet addressed to an external Internet IP address associated with the Internet APN 395. UE A 105A sends this data packet to its serving PPU (i.e., PPU A 115A). PPU A 115A receives the data packet and performs a lookup in the routing table 150 to determine how to route the data packet. PPU A 115A looks up the relevant entry in the routing table using a key that is based on an identifier that represents all external Internet IP addresses (e.g., "*") and the APN of the data packet. Since the data packet is addressed to an external Internet IP address associated with the Internet APN 395, the relevant DRT entry is entry 212. PPU A 115A then retrieves the corresponding value of the relevant DRT entry 212. The corresponding value represents the IP address of the PPU 115 that has peering to the PDN associated with the APN and a default TEID that identifies, to that PPU 115, the PDN. In this example, the corresponding value indicates that PPU D 115D has peering to the Internet PDN 125 and that the default TEID for the Internet APN 360 should be used to tunnel the data packet. PPU A then tunnels the data packet to the IP address of PPU D 330 using the default TEID for the Internet APN 360. The default TEID for the Internet APN 360 uniquely identifies, to PPU D 115D, that the data packet belongs to the Internet PDN 125. Upon receiving the data packet, PPU D 115D can route the data packet to the Internet PDN 125 based on the default TEID. Thus, even if PPU D 115D is connected to multiple PDNs (as shown in FIG. 3), the default TEID allows PPU D 115D to uniquely identify the correct PDN on which to route the data packet.

Example embodiments are described herein with reference to block diagrams and/or flowchart illustrations of computer-implemented methods, apparatus (systems and/or devices) and/or computer program products. It should be noted that in some alternate implementations, the functions/ acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Figure 4A:
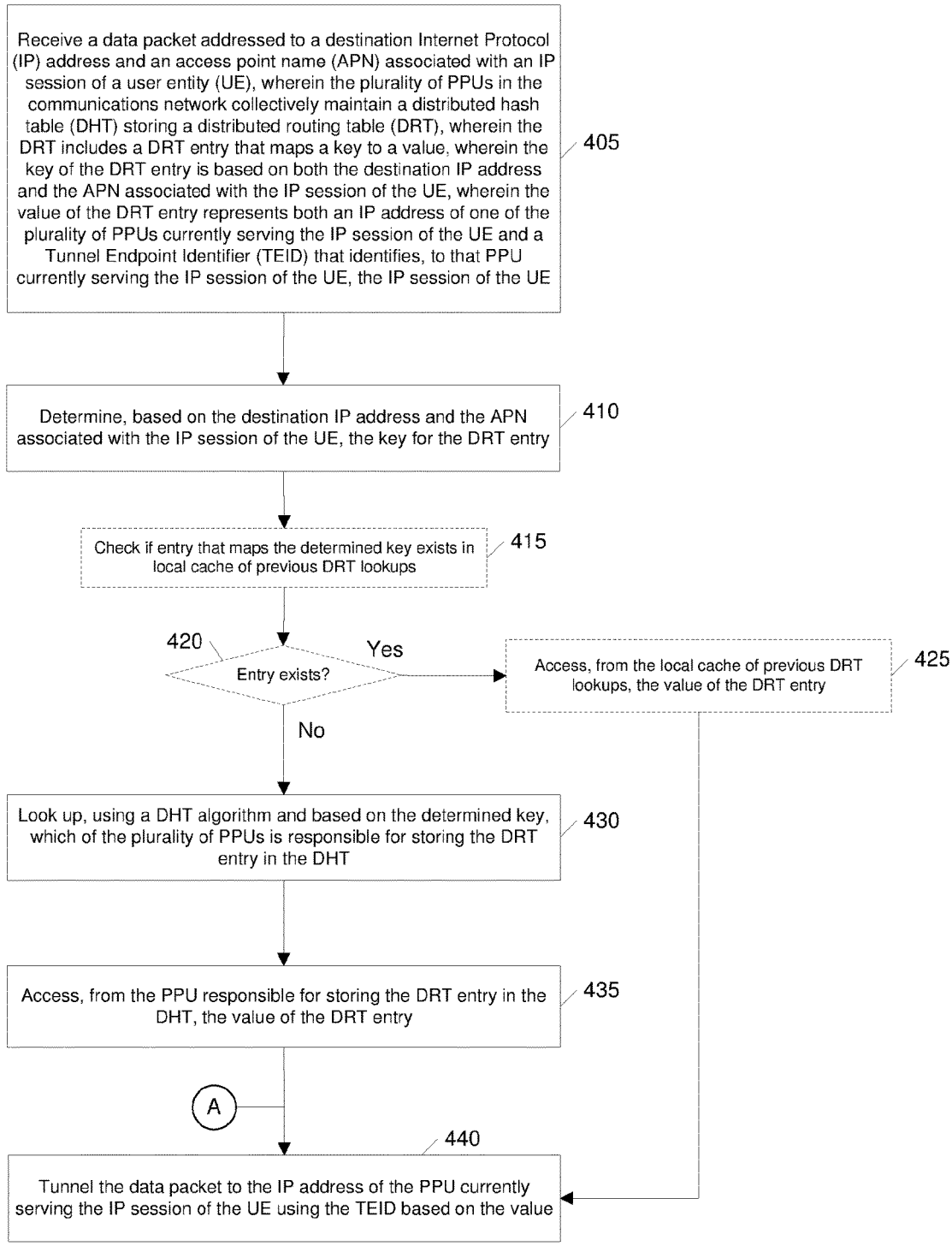
FIG. 4A is a flow diagram of one embodiment of a process for routing a data packet to a UE.

FIG. 4A is a flow diagram of one embodiment of a process for routing a data packet to a UE. The operations in the flow diagram may be performed by various components of a physical or virtual PPU.

In one embodiment, the process is initiated when a PPU 115 receives a data packet addressed to a destination IP address and an APN associated with an IP session of a UE 105 (block 405). The plurality of PPUs 115 in the communications network (e.g., an EPC network 100) collectively maintain a DHT storing a distributed routing table DRT, and the DRT includes a DRT entry that maps a key to a value. The key of the DRT entry is based on both the destination IP address and the APN associated with the IP session of the UE 105, while the value of the DRT entry represents both an IP address of one of the plurality of PPUs 115 currently serving the IP session of the UE 105 and a Tunnel Endpoint Identifier TEID that identifies, to that PPU 115 currently serving the IP session of the UE 105, the IP session of the UE 105. In one embodiment, the data packet can be originated by a UE 105 that is currently served by the PPU 115 or from a PDN that is connected to the PPU 115, and is destined for a different one of the UEs 105.

The PPU 115 determines, based on the destination IP address and the APN associated with the IP session of the UE 105, the key for the DRT entry (block 410). For example, for the exemplary routing table 150 illustrated in FIG. 2, the PPU 115 determines the key based on a combination of the APN and the destination IP address associated with the IP session of the UE 105 (both of which are known to the PPU 115 based on the contents of the received data packet and/or control information previously communicated between various elements of the network 100 (e.g., the sending UE 105, eNB 110, MME 120, PPU 115, and Home Subscriber Server)).

In one embodiment, the PPU 115 checks whether an entry that maps the determined key exists in its local cache of previous DRT lookups 165 (block 415 and decision block 420). In one embodiment, the PPU 115 stores the local cache of previous DRT lookups 165 using a data structure that allows for efficient look up based on the key as previously described. If an entry that maps the determined key exists in the cache, the PPU 115 can access the value of the DRT entry from its local cache of previous DRT lookups 165 (block 425), without having to make a query to the DRT. The value of the DRT entry represents the IP address of the PPU 115 that is currently serving the IP session of the UE 105 and a TEID that identifies, to that PPU 115 currently serving the UE 105, the IP session of the UE 105. The PPU 115 can then tunnel the data packet to its destination based on the value of the DRT entry. Blocks 415, 420 and 425 are dashed to indicate they are optional and applicable only in embodiments where a cache is implemented.

If an entry that maps the determined key does not exist in the PPU's local cache of previous DRT lookups 165, the PPU 115 looks up, using a DHT algorithm and based on the determined key, which of the plurality of PPUs 115 is responsible for storing the DRT entry in the DHT (block 430). In one embodiment, the PPU 115 looks up which of the plurality of PPUs 115 is responsible for storing the DRT entry in the DHT based on calculating a hash value of the key. The PPU 115 that has an ID that is closes to the hash value of the key is responsible for storing the DRT entry, as described with reference to FIG. 1. The PPU responsible for storing the DRT entry in the DHT could be a remote PPU or the PPU itself.

The PPU 115 accesses, from the PPU responsible for storing the DRT entry in the DHT, the value of the DRT entry (block 435). An embodiment of a process for accessing the DRT entry in the DHT is described herein below in additional detail with reference to FIG. 4B.

Figure 4B:
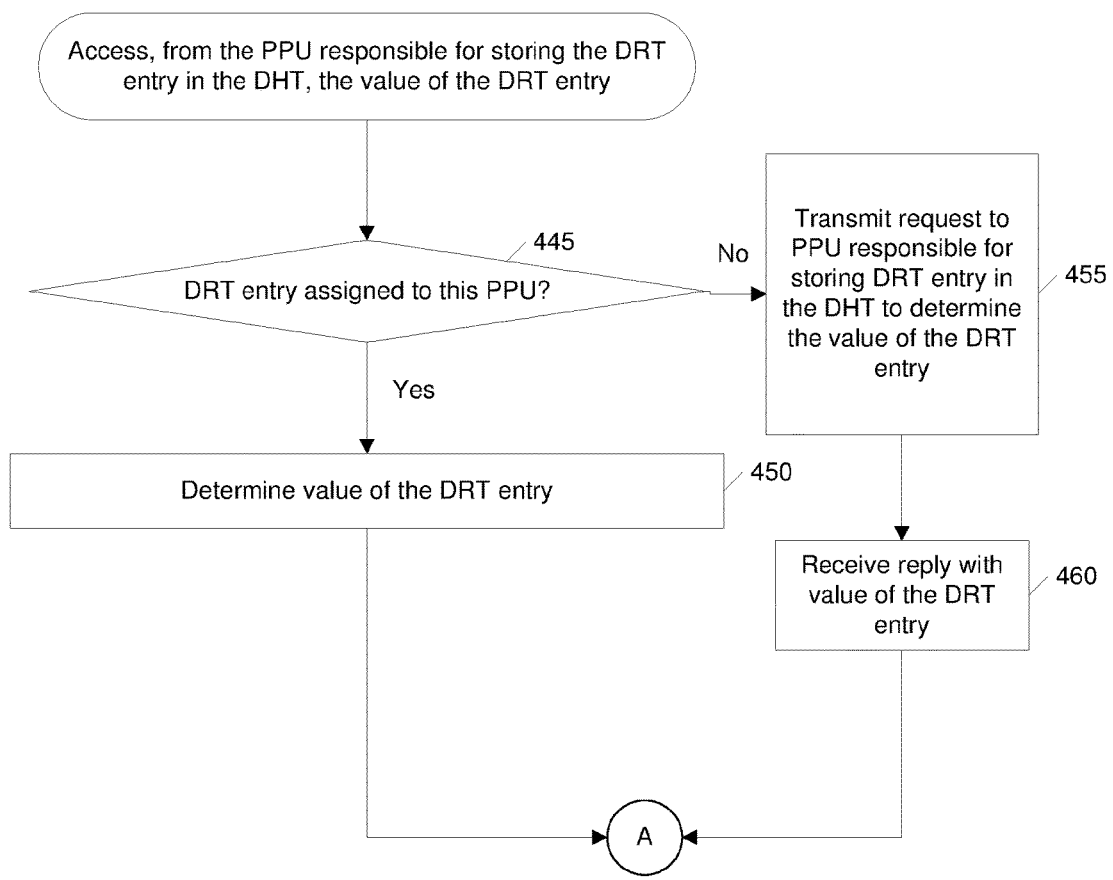
FIG. 4B is a flow diagram of one embodiment of a process for accessing, from a PPU responsible for storing a DRT entry in the DHT, a value of the DRT entry.

FIG. 4B is a flow diagram of one embodiment of a process for accessing, from a PPU responsible for storing a DRT entry in the DHT, a value of the DRT entry. It is to be noted that the PPU responsible for storing the DRT entry could be a remote PPU or the PPU itself. Thus, the PPU 115 checks whether the DRT entry is assigned to itself (decision block 445). If so, the PPU 115 can directly determine the value of the DRT entry (block 450), without having to transmit a request to a remote PPU 115. The process then proceeds to block 440 to resume the data packet routing process. Returning to decision block 445, if the DRT entry is not assigned to this PPU 115 (i.e., assigned to a remote PPU 115), then the PPU 115 transmits a request to the PPU responsible for storing the DRT entry in the DHT to determine the value of the DRT entry (block 455). The PPU 115 receives a reply from the responsible PPU 115 that indicates the value of the DRT entry (block 460), and the process proceeds to block 440 to resume the data packet routing process.

Returning to FIG. 4A, the PPU 115 then tunnels the data packet to the IP address of the PPU 115 currently serving the IP session of the UE using the TED based on the value (block 440). In one embodiment, the data packet is tunneled using a General Packet Radio Service (GPRS) tunneling protocol (GTP). In such an embodiment, the data packet can be encapsulated with a GTP header and the GTP header can include TEID information. Other tunneling protocols that create a specific and identifiable link between PPUs 115 can be used as well.

In one embodiment, the PPU 115 inserts an entry in its local cache of previous DRT lookups 165 that maps the key determined in block 410 to the value accessed in block 435. This allows the PPU 115 to forward/route any subsequent packets addressed to the same IP address and APN without having to perform a DHT lookup, thus reducing the delays associated with DHT lookups.

The use of a caching mechanism has some implications in the case of UE 105 mobility. If a UE 105 experiences handover to another PPU 115, previously cached routing entries to reach that UE can be incorrect, and data packets will be forwarded to an incorrect PPU 115 (i.e., to the UE's previous serving PPU). In one embodiment, this inconsistency can be dealt with by having the PPU 115 that previously served the UE 105 (before the handover) temporarily forward packets to the UE's 105 new serving PPU 115. In one embodiment, the UE's 105 previous serving PPU 115 can notify the sending PPU 115 (that has the stale cache entry) that the UE 105 has been handed over to the new serving PPU 115. The sending PPU 115 can then update its cache 160 based on information obtained from the notification message. In one embodiment, the DHT has a tracking mechanism that notifies PPUs 115 when a particular DRT entry is modified or deleted due to UE handover or UE detachment. When a DRT entry for reaching a UE 105 is modified or deleted, the tracking mechanism can notify PPUs 115 to update their respective cache entries.

Figure 5:
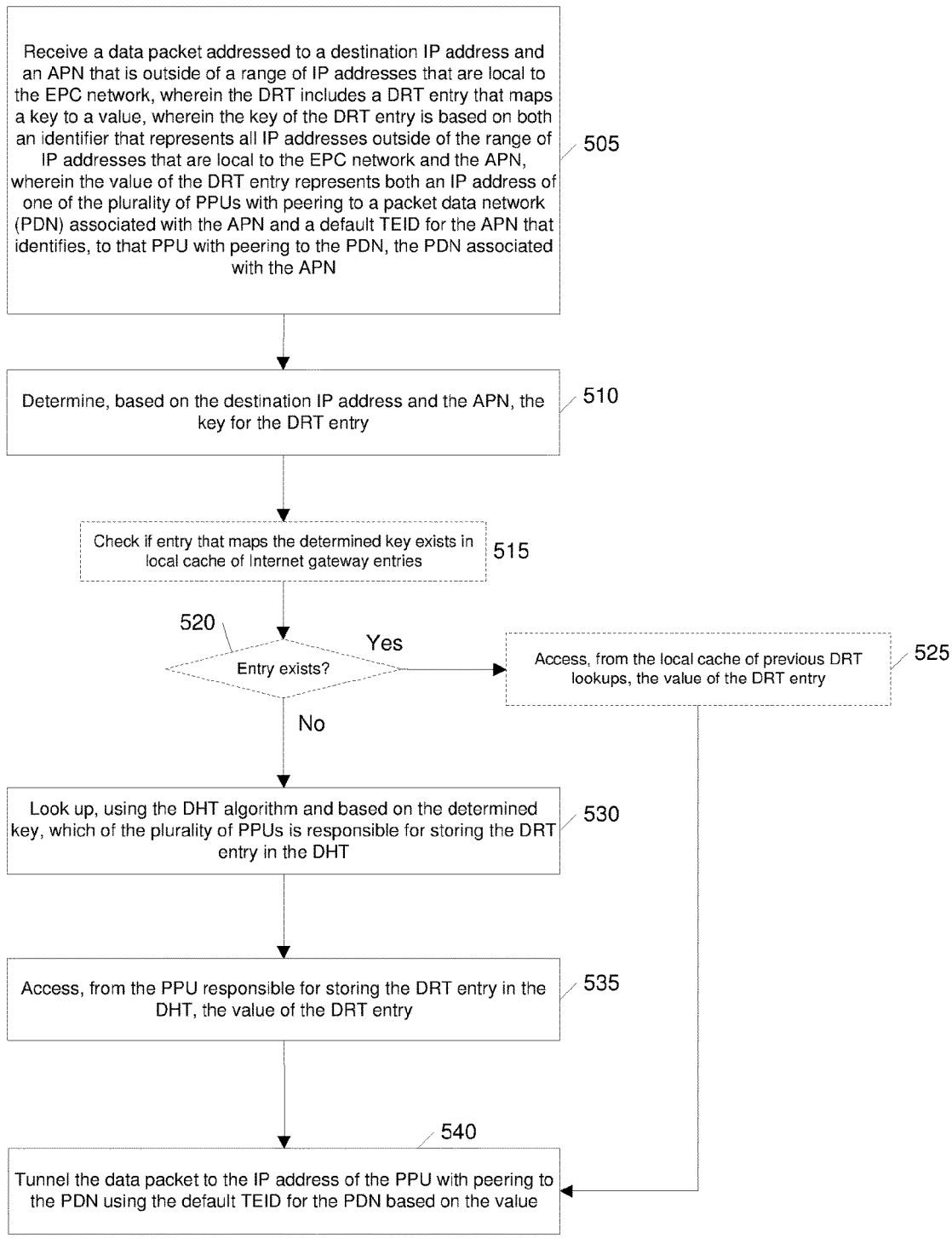
FIG. 5 is a flow diagram of one embodiment of a process for routing a data packet to a PDN.

FIG. 5 is a flow diagram of one embodiment of a process for routing a data packet to a PDN. The operations in the flow diagram may be performed by various components of a physical or virtual PPU.

In one embodiment, the process is initiated when a PPU 115 receives a data packet addressed to a destination IP address and an APN that is outside of a range of IP addresses that are local to the communications network (e.g., an EPC network 100) (block 505). The plurality of PPUs 115 in the communications network collectively maintain a DHT storing a distributed routing table DRT, and the DRT includes a DRT entry that maps a key to a value. The key of the DRT entry is based on both an identifier that represents all IP addresses outside of the range of IP addresses that are local to the communications network and the APN, while the value of the DRT entry represents both an IP address of one of the plurality of PPUs 115 with peering to a packet data network (PDN) associated with the APN and a default TED for the APN that identifies, to that PPU 115 with peering to the PDN, the PDN associated with the APN. In one embodiment, the data packet is originated by a UE 105 that is currently served by the PPU 115.

The PPU 115 determines, based on the destination IP address and the APN, the key for the DRT entry (block 510). In one embodiment, the PPU 115 checks whether the data packet is an Internet data packet. In one embodiment, the PPU 115 can identify the data packet as an Internet data packet based on recognizing that the destination IP address and the APN are outside of a range of IP addresses that are local to the EPC network 100. In one embodiment, the PPU 115 stores data that identifies the range(s) of IP addresses that are local to the EPC network 100 and compares this data with the destination IP address of the data packet to determine whether the data packet is an Internet data packet. If the data packet is an Internet data packet, then the key will be based on an identifier that represents all IP addresses outside of the range of IP addresses that are local to the EPC network 100. For example, for the exemplary routing table 150 illustrated in FIG. 2, the PPU 115 determines the key based on a combination of the APN (which is located within the received data packet and/or received from the sending UE 105) and an identifier that represents all IP addresses outside of the range of IP address that are local to the EPC network (i.e., "*").

In one embodiment, the PPU 115 checks whether an entry that maps the determined key exists in its local cache of Internet gateway entries 170 (decision block 515). In one embodiment, the PPU 115 stores the local cache of Internet gateway entries 170 using a data structure that allows for efficient look up based on the key as previously described. If an entry that maps the determined key exists in the local cache 170, the PPU 115 can access the value of the DRT entry from its local cache of Internet gateway entries 170 (block 525), without having to make a query to the DRT. The value of the DRT entry represents the IP address of the PPU 115 that has peering to the PDN associated with the APN and a default TEID that identifies, to that PPU 115 with peering to the PDN, the PDN associated with the APN. The PPU 115 can then tunnel the data packet to its destination based on the value of the DRT entry (block 540). Blocks 515, 520, and 525 are dashed to indicate they are optional and applicable only in embodiments where a cache is implemented. In one embodiment, a PPU 115 populates its local cache of Internet gateway entries 170 when joining the DHT network. For example, the PPU 115 can copy the Internet gateway entries of its neighbor(s) in the DHT or from any other PPU 115 participating in the DHT. In the same or an alternative embodiment, one or more of the PPUs 115 periodically broadcast Internet gateway entries to PPUs 115 participating in the DHT so that other PPUs 115 can update and/or populate their respective local cache of Internet gateway entries 170.

If an entry that maps the determined key does not exist in the PPU's local cache of Internet gateway entries 170, the PPU 115 looks up, using the DHT algorithm and based on the determined key, which of the plurality of PPUs 115 is responsible for storing the DRT entry in the DHT (block 530). In one embodiment, the PPU 115 looks up which of the plurality of PPUs 115 is responsible for storing the DRT entry in the DHT based on calculating a hash value of the key. The PPU 115 that has an ID that is closest to the hash value of the key is responsible for storing the DRT entry, as described with reference to FIG. 1. The PPU responsible for storing the DRT entry in the DHT could be a remote PPU or the PPU itself.

The PPU 115 accesses, from the PPU responsible for storing the DRT entry in the DHT, the value of the DRT entry (block 535). In one embodiment, the PPU 115 performs operations similar to that described with relation to block 435 of FIG. 4A and FIG. 4B to access the value from the responsible PPU.

The PPU 115 then tunnels the data packet to the IP address of the PPU 115 with peering to the PDN using the default TEID based on the value (block 540). In one embodiment, the data packet can be tunneled in a similar manner as that described with reference to block 440.

In one embodiment, the PPU 115 inserts an entry in its local cache of Internet gateway entries 170 that maps the key determined in block 510 to the value accessed in block 535. This allows the PPU 115 to forward/route any subsequent packets addressed to the same APN without having to perform a DHT lookup, thus reducing the delays associated with DHT lookups.

Figure 6:
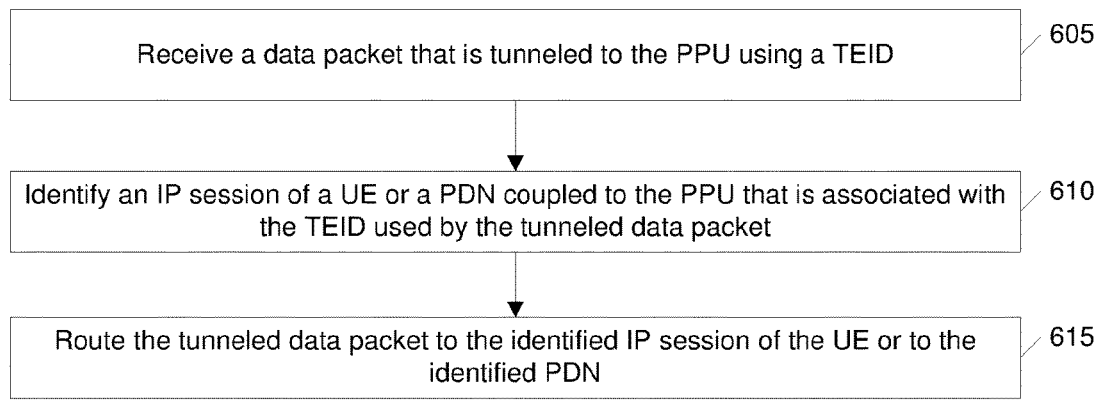
FIG. 6 is a flow diagram of one embodiment of a process for routing a data packet to an IP session or PDN coupled to the PPU.

FIG. 6 is a flow diagram of one embodiment of a process for routing a data packet to an IP session or PDN coupled to the PPU. The operations in the flow diagram may be performed by various components of a physical or virtual PPU.

In one embodiment, the process is initiated when the PPU 115 receives a data packet that is tunneled to the PPU 115 using a TED (block 605). The TEID used by the tunnel was previously generated by the PPU 115 and uniquely identifies to the PPU 115 an IP session of a UE 105 or a PDN coupled to the PPU 115 (as described later herein).

The PPU 115 identifies an IP session of a UE 105 or PDN coupled to the PPU 115 that is associated with the TEID used by the tunneled data packet (block 610). In one embodiment, the PPU 115 stores a mapping table that maps a TEID to an IP session of a UE 105 or a PDN. The PPU 115 can use this mapping table to uniquely identify the IP session of a UE 105 or PDN that is associated with the TEID used by the tunneled data packet.

The PPU 115 then routes the tunneled data packet to the identified IP session of the UE 105 or to the identified PDN (block 615). In one embodiment in which the destination is a UE 105, the data packet can be routed to the identified IP session on an EPS bearer for that IP session. In one embodiment, a traffic flow template (TFT) installed at the PPU 115 can be used to select the appropriate bearer on which to route the data packet.

Figure 7:
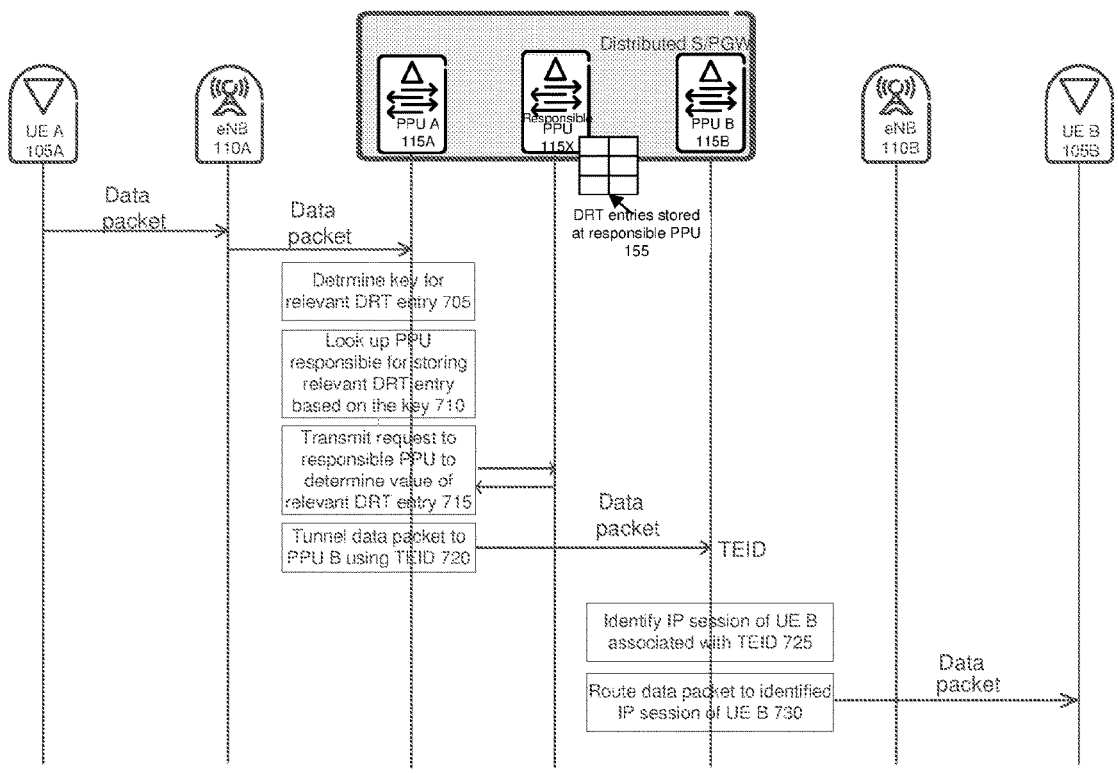
FIG. 7 is a transactional diagram illustrating one embodiment of a process for routing data packets from a UE to another UE in an EPC network having a distributed S/PGW architecture, where the relevant DRT entry is not already cached (or the cache is not implemented) and is stored in a remote PPU.

FIG. 7 is a transactional diagram illustrating one embodiment of a process for routing data packets from a UE to another UE in an EPC network having a distributed S/PGW architecture, where the relevant DRT entry is not already cached (or the cache is not implemented) and is stored in a remote PPU. In other words, FIG. 7 is a transactional diagram corresponding to a particular path though the flow diagrams illustrated in FIGS. 4A and 4B (a transactional diagram corresponding to the other paths through FIGS. 4A and 4B are not included as they would be apparent to one of ordinary skill in the art based the present description). UE A 105A sends a data packet, addressed to the IP address and APN of an IP session of UE B 105B, towards its serving PPU (i.e., PPU A 115A). PPU A 115A then determines a key for the relevant DRT entry based on the IP address and APN of the IP session of UE B 105B (both of which are located within the received data packet and/or received from UE A 105A) (block 705). The relevant DRT entry is an entry that provides routing information for reaching the IP session of UE B 105B. PPU A 115A looks up the PPU responsible for storing the relevant DRT entry in the DHT based on the determined key (block 710). In this example, the relevant DRT entry is stored at a remote PPU (i.e., the responsible PPU 115X). PPU A 115A accesses the value of the relevant DRT entry by transmitting a request to the responsible PPU 115X (block 715). The value of the relevant DRT entry represents an IP address of a PPU 115 that is serving the IP session of UE B 105B (i.e., PPU B 115B) and a TED that identifies, to PPU B 115B, that IP session of UE B 105B. PPU A 115A then tunnels the data packet to the IP address of PPU B 115B using the TEID (block 720). PPU B 115B receives the tunneled data packet and the TEID (block 725). PPU B 115B identifies the IP session of UE B 105B that is associated with the TEID and routes the data packet to the identified IP session of UE B 105B (block 730).

Figure 8:
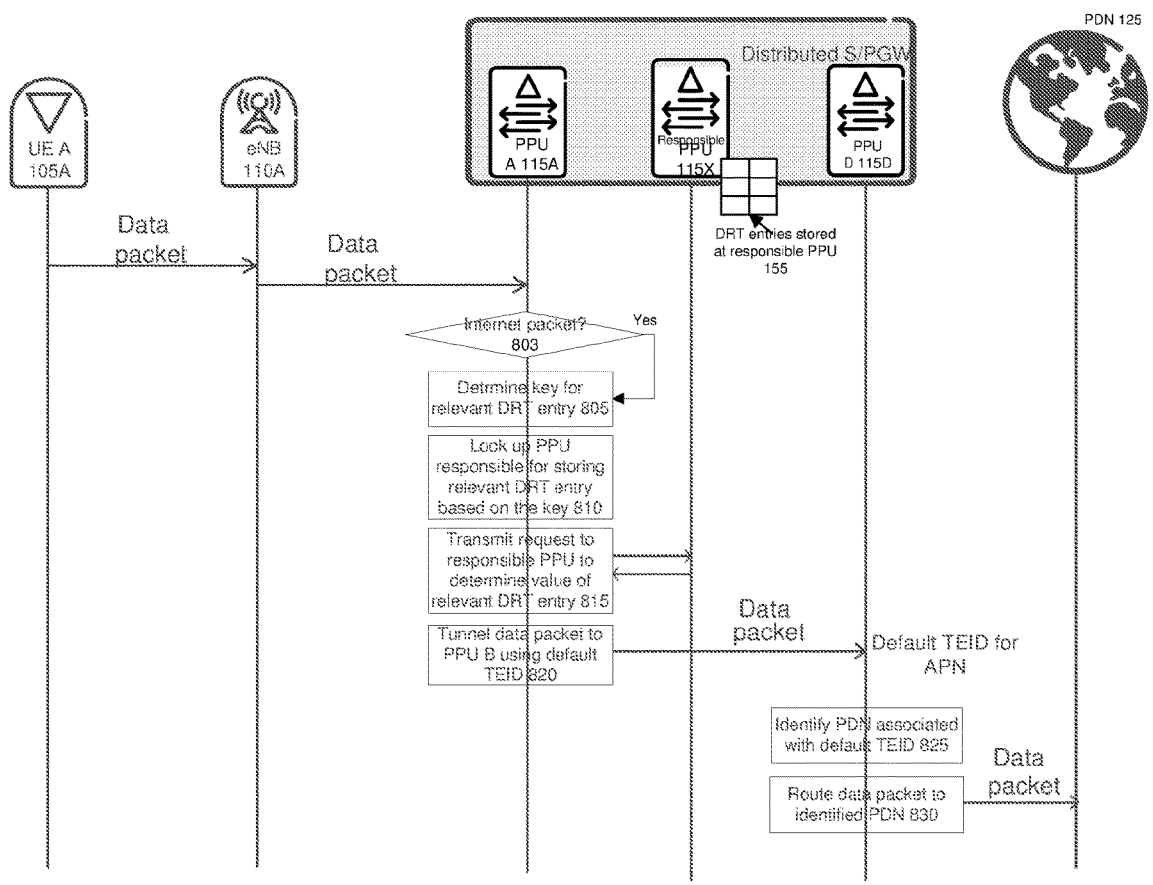
FIG. 8 is a transactional diagram illustrating one embodiment of a process for routing data packets from a UE to a PDN in an EPC network having a distributed S/PGW architecture, where the relevant DRT entry is not already cached (or the cache is not implemented) and is stored in a remote PPU.

FIG. 8 is a flow diagram illustrating one embodiment of a process for routing data packets from a UE to a PDN in an EPC network having a distributed S/PGW architecture, where the relevant DRT entry is not already cached (or the cache is not implemented) and is stored in a remote PPU. In other words, FIG. 8 is a transactional diagram corresponding to a particular path though the flow diagram illustrated in FIG. 5 (a transactional diagram corresponding to the other paths through FIG. 5 are not included as they would be apparent to one of ordinary skill in the art based the present description). UE A 105A sends a data packet addressed to an IP address and APN that is outside of the range of IP addresses that are local to the EPC network 100 towards its serving PPU (i.e., PPU A 115A). PPU A 115A checks whether the data packet is an Internet packet based on inspection of the IP address and APN of the data packet (decision block 803). If the data packet is an Internet packet, PPU A 115A determines a key for the relevant DRT entry based on an identifier that represents all IP addresses outside of the range of IP addresses that are local to the EPC network 100 (e.g., "*") and the APN (block 805). The relevant DRT entry is an entry that provides routing information for reaching the PDN 125 that is associated with the APN. PPU A 115A looks up the PPU responsible for storing the relevant DRT entry in the DHT based on the determined key (block 810). In this example, the relevant DRT entry is stored at a remote PPU (i.e., the responsible PPU 115X). PPU A 115A accesses the value of the relevant DRT entry by transmitting a request to the responsible PPU 115X (block 815). The value of the relevant DRT entry represents an IP address of a PPU 115 with peering to a PDN that is associated with the APN (i.e., PPU D 115D) and a default TEID that identifies to PPU D 115D, that PDN. PPU A 115A then tunnels the data packet to the IP address of PPU D 115D using the default TEID (block 820). PPU D 115D receives the tunneled data packet and the default TEID. PPU D 115D identifies the PDN that is associated with the default TEID (block 825) and routes the data packet to the identified PDN 125 (block 830).

Figure 9:
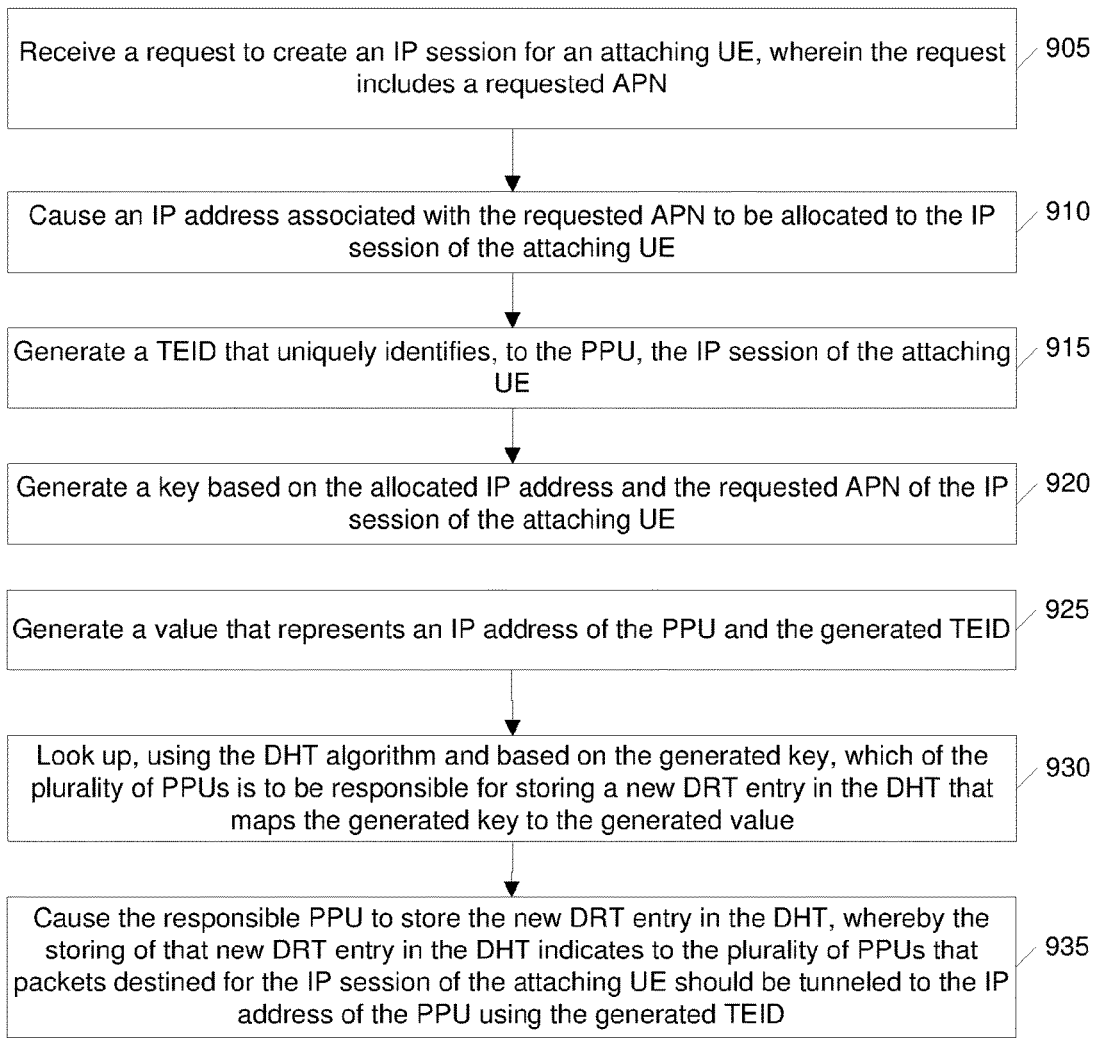
FIG. 9 is a flow diagram of one embodiment of a process for maintaining the DRT when a UE attaches to the EPC network.

FIG. 9 is a flow diagram of one embodiment of a process for maintaining the DRT when a UE attaches to the EPC network. The operations in the flow diagram may be performed by various components of a physical or virtual PPU.

In one embodiment, the process is initiated when a PPU 115 receives a request to create an IP session for an attaching UE 105, wherein the request includes a requested APN (block 905). In one embodiment, the request to create an IP session for the attaching UE 105 is a Create Session Request message from a MME (see 3GPP TS 23.401).

The PPU 115 causes an IP address associated with the requested APN to be allocated to the IP session of the attaching UE 105 (block 910). In one embodiment, the IP address is allocated by using a version of DHCP (e.g., DHCPv4 or DHCPv6). Different embodiments may allocate IP addresses in different ways and the invention is not limited to using DHCP.

The PPU 115 generates a TEID that uniquely identifies, to the PPU 115, the IP session of the attaching UE 105 (block 915). The TEID is a unique identifier that the PPU 115 can use to identify a particular IP session of a specific UE 105. Since it is possible that the same IP address (associated with two different APNs) can be assigned to two different UEs 105 or even two IP sessions within the same UE 105, the TEID allows the PPU 115 to easily distinguish between packets belonging to different APNs. It is to be noted that the TEID is different from the S1 TEIDs and S5/S8 TEIDs used for GTP tunnels since the TEID is generated per APN/IP address and not per bearer.

The PPU 115 generates a key based on the allocated IP address and the requested APN of the IP session of the attaching UE (block 920). For example, for the exemplary routing table 150 illustrated in FIG. 2, the PPU 115 generates the key based on a combination of the allocated IP address and the requested APN of the IP session of the attaching UE 105.

The PPU 115 generates a value that represents an IP address of the PPU 115 and the generated TEID (block 925). For example, for the exemplary routing table 150 previously described in FIG. 2, the PPU 115 generates a value that is based on a combination of the IP address of the PPU 115 and the generated TEID.

The PPU 115 looks up, using the DHT algorithm and based on the generated key, which of the plurality of PPUs 115 is to be responsible for storing a new DRT entry in the DHT that maps the generated key to the generated value (block 930). In one embodiment, the PPU 115 looks up which of the plurality of PPUs 115 is to be responsible for storing the DRT entry in the DHT based on calculating a hash value of the generated key. The PPU 115 that has an ID that is closes to the hash value of the generated key is to be responsible for storing the DRT entry, as described with reference to FIG. 1. The PPU 115 to be responsible for storing the DRT entry in the DHT could be a remote PPU or the PPU itself.

The PPU 115 then causes the responsible PPU 115 to store the new DRT entry in the DHT, whereby the storing of that new DRT entry in the DHT indicates to the plurality of PPUs 115 that packets destined for the IP session of the attaching UE 105 should be tunneled to the IP address of the PPU 115 using the generated TED (block 935). As a result, this DRT entry will be available when another PPU 115 receives a data packet that needs to be tunneled according to that DRT entry (see FIGS. 4A-B and 7).

Figure 10:
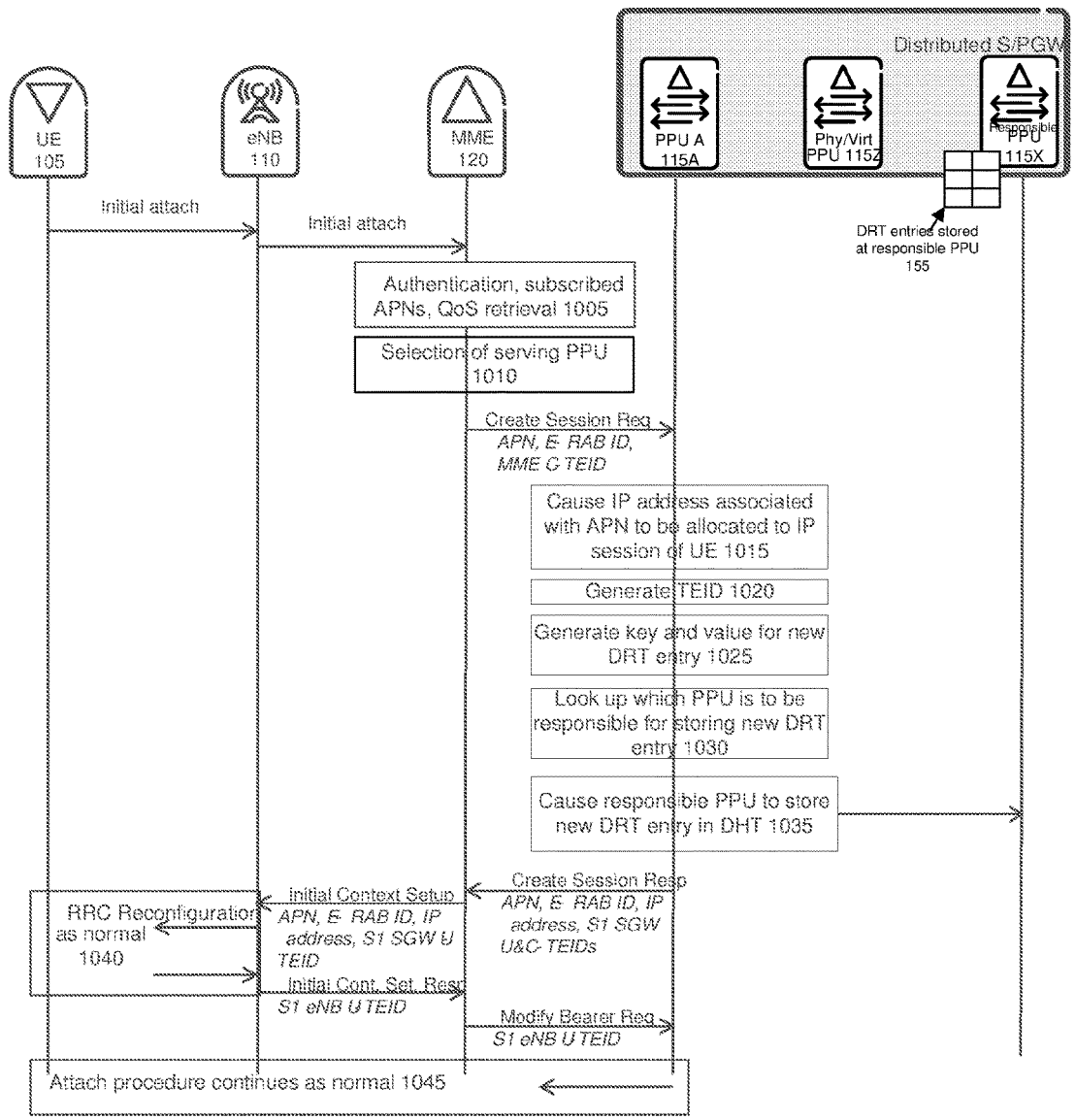
FIG. 10 is a transactional diagram of one embodiment of a UE attach process in an EPC network having a distributed S/PGW architecture, where the relevant DRT entry is to be stored in a remote PPU.

FIG. 10 is a transactional diagram of one embodiment of a UE attach process in an EPC network having a distributed S/PGW architecture, where the relevant DRT entry is to be stored in a remote PPU. In one embodiment, a UE 105 initiates the attach procedure by sending an attach request message to an MME 120. In one embodiment, the attach request message also includes APN information. In one embodiment, the MME 120 performs authentication of the UE 105, determines subscribed APNs, retrieves QoS parameters, and other control functionality (block 1005). The MME 120 selects a serving PPU 115 for the UE 105 (block 1010). In one embodiment, PPU 115 selection information is statically configured in the MME 120. For example, the MME 120 may store a mapping of eNBs 110 to PPUs 115 so that UEs 105 connecting via a particular eNB 110 will be assigned a serving PPU 115 based on the mapping of eNBs 110 to PPUs 115. In other embodiments, the eNB 110 can signal to the MME 120 a local PPU 115 that it supports. This information can then be used to store an eNB 110 to PPU 115 mapping. In this example, the MME 120 chooses PPU A 115A to serve the UE 105. The MME 120 sends a Create Session Request message to PPU A 115A to create an IP session for the UE 105. In one embodiment, the Create Session Request message can include APN, E-RAB ID, and MME C-TEID information. PPU A 115A causes an IP address associated with the requested APN to be allocated to the IP session of the UE 105 (block 1015). In one embodiment, an IP address is allocated using a Dynamic Host Configuration Protocol (DHCP). PPU A 115A generates a TEID for the IP session (block 1020). The TEID serves as a unique identifier that PPU A 115A can use to identify the IP session of the UE 105. PPU A 115A generates a key based on the allocated IP address and the requested APN of the IP session of the UE 105 (block 1025). PPU A 115A also generates a value that represents an IP address of PPU A 115A and the generated TEID (block 1025). The generated key and the generated value will be the key and value, respectively, for a new DRT entry in the DHT. PPU A 115A looks up which PPU 115 is to be responsible for storing the new DRT entry in the DHT based on the generated key (block 1030). In this example, the new DRT entry is to be stored at a remote PPU (i.e., the responsible PPU 115X). PPU A 115Z then causes the responsible PPU 115X to store the new DRT entry in the DHT (block 1035). PPU A 115A sends a Create Session Response message back to the MME 150. In one embodiment, the Create Session Response message can include APN, E-RAB ID, IP address allocated to the UE, and S1 SGW user plane TEID (U-TEID), and S1 SGW control plane TEID (C-TEID) information. The MME 120 sends an Initial Context Setup message to the eNB 110. In one embodiment, the Initial Context Setup message can include APN, E-RAB ID, IP address allocated to the UE 105, and S1 SGW U-TEID information. The eNB 110 and UE 105 communicate with each other to perform Radio Resource Control (RRC) reconfiguration (block 1040). The eNB 110 responds with an Initial Context Setup Response message to the MME 120. In one embodiment, the Initial Context Setup Response message includes S1 eNB U-TEID information. The MME 120 sends a Modify Bearer Request message to the PPU A 115A. In one embodiment, the Modify Bearer Request message includes S1 eNB U-TEID information. Then the UE 105 attach procedure continues as normal per legacy procedures (block 1045). As a result, a new DRT entry has been stored in the DHT to indicate that PPU A 115A is serving the IP session of the UE 105 and that packets destined for that IP session should use the generated TED.

Figure 11:
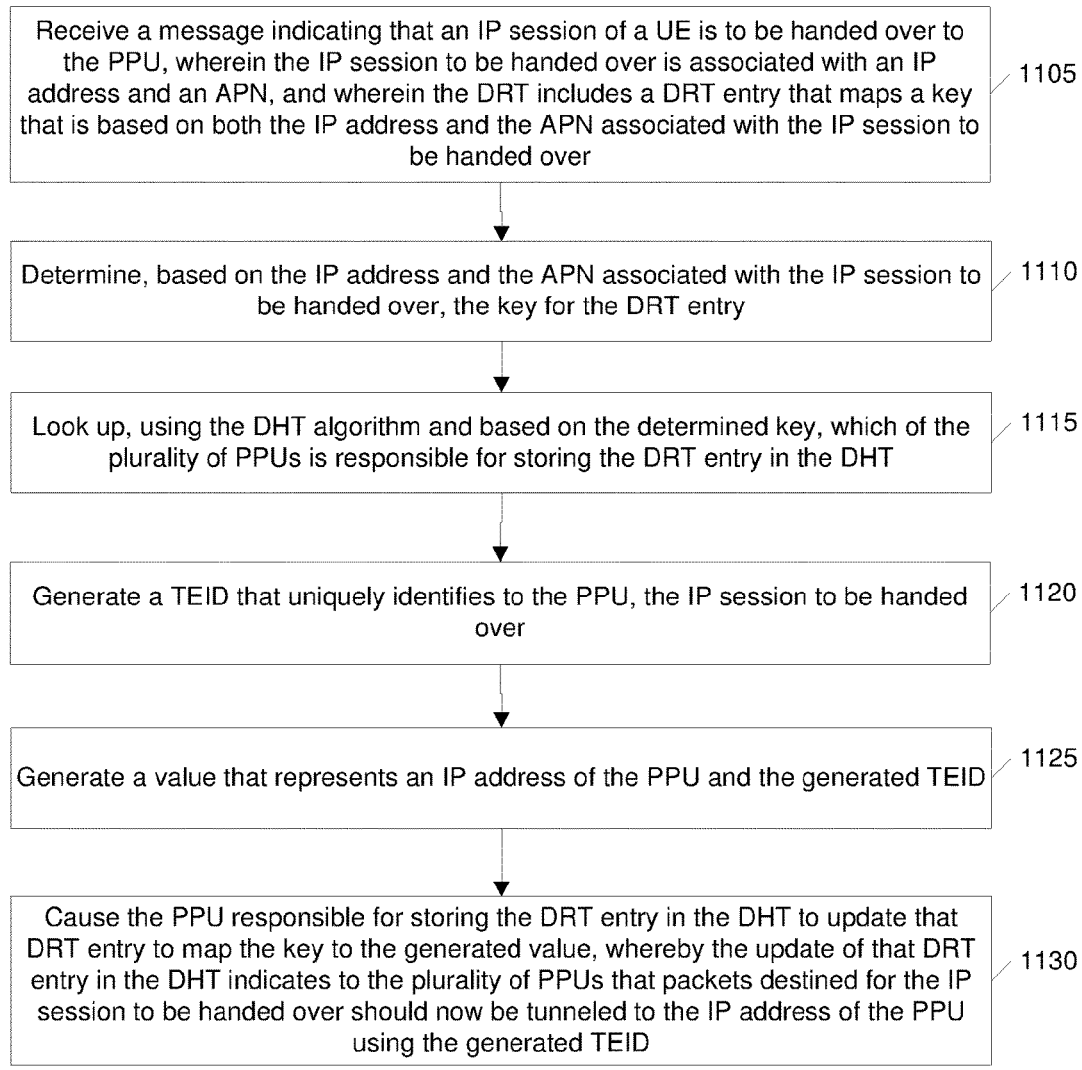
FIG. 11 is a flow diagram of one embodiment of a process for maintaining the DRT when a UE experiences handover.

FIG. 11 is a flow diagram of one embodiment of a process for maintaining the DRT when a UE experiences handover. The operations in the flow diagram may be performed by various components of a physical or virtual PPU.

In one embodiment, the process is initiated when a PPU 115 receives a message indicating that an IP session of a UE 105 is to be handed over to the PPU 115 (block 1105). The IP session to be handed over is associated with an IP address and an APN, and a DRT includes a DRT entry that maps a key that is based on both the IP address and the APN associated with the IP session to be handed over. In one embodiment, the message indicating that the IP session of the UE 105 is to be handed over to the PPU 115 is a Modify Bearer Request message from a MME (see 3GPP TS 23.401).

The PPU 115 determines, based on the IP address and the APN associated with the IP session to be handed over, the key for the DRT entry (block 1110). For example, for the exemplary routing table 150 illustrated in FIG. 2, the PPU 115 determines the key based on a combination of the APN and the IP address associated with the IP session to be handed over.

The PPU 115 looks up, using the DHT algorithm and based on the determined key, which of the plurality of PPUs 115 is responsible for storing the DRT entry in the DHT (block 1115). In one embodiment, the PPU 115 looks up which of the plurality of PPUs 115 is responsible for storing the DRT entry in the DHT based on calculating a hash value of the key, as previously described with reference to block 430. The PPU responsible for storing the DRT entry in the DHT could be a remote PPU or the PPU itself.

The PPU 115 generates a TEID that uniquely identifies to the PPU 115, the IP session to be handed over (block 1120). As discussed above, the TED is a unique identifier that the PPU 115 can use to identify a particular IP session of a specific UE 105.

The PPU 115 generates a value that represents an IP address of the PPU 115 and the generated TEID (block 1125). For example, for the exemplary routing table 150 previously described in FIG. 2, the PPU 115 generates a value that is based on a combination of the IP address of the PPU 115 and the generated TEID.

The PPU 115 then causes the PPU responsible for storing the DRT entry in the DHT to update that DRT entry to map the key to the generated value, whereby the update of that DRT entry in the DHT indicates to the plurality of PPUs 115 that packets destined for the IP session to be handed over should now be tunneled to the IP address of the PPU 115 using the generated TEID (block 1130).

Figure 12:
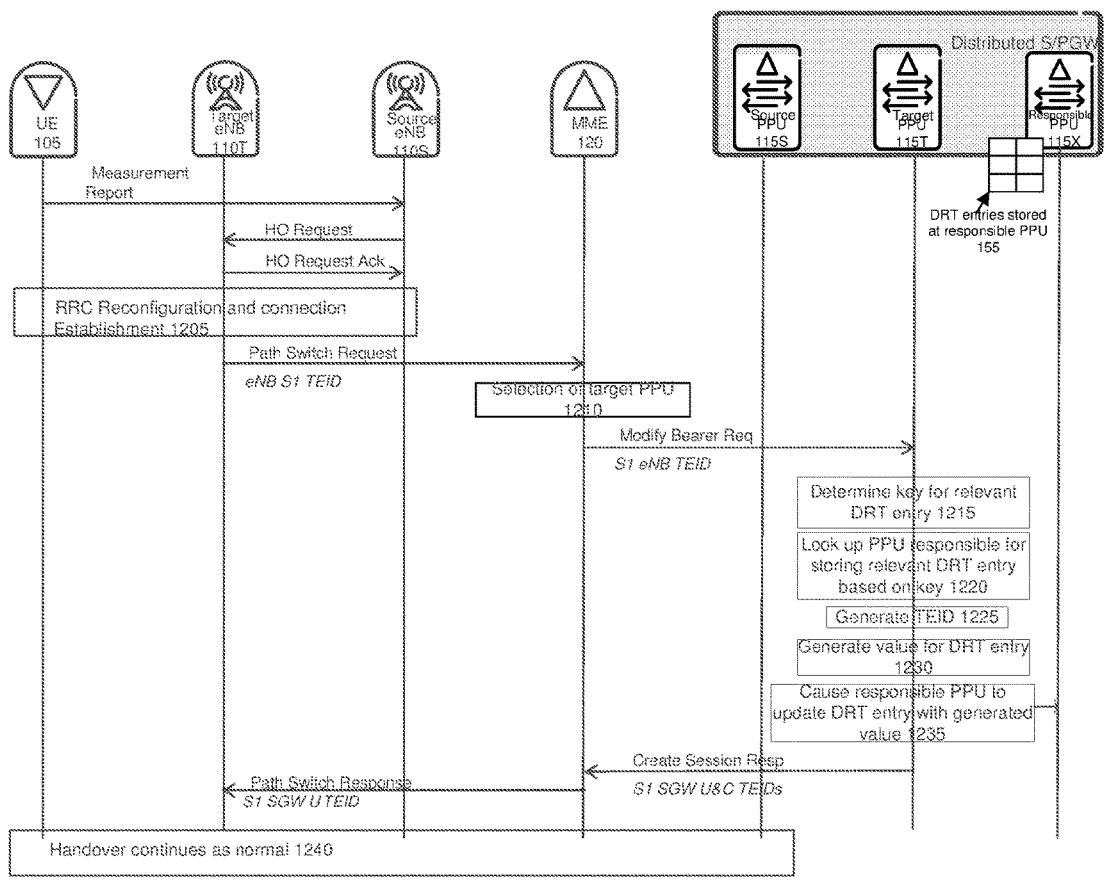
FIG. 12 is a transactional diagram of one embodiment of a UE handover process in an EPC network having a distributed S/PGW architecture, where the relevant DRT entry is to be stored in a remote PPU.

FIG. 12 is a transactional diagram of one embodiment of a UE handover process in an EPC network having a distributed S/PGW architecture, where the relevant DRT entry is to be stored in a remote PPU. When a UE 105 experiences handover from a source eNB 105/PPU 115 to a target eNB 105/PPU 115, the DRT needs to be updated to reflect this change. A UE 105 is initially served by a source PPU 115S via a source eNB 110S. The UE 105 periodically sends measurement reports to the source eNB 110S. When the source eNB 110S determines that the UE 105 needs to be handed over to the target eNB 110T, the source eNB 110S sends a Handover Request (HO Request) message to the target eNB 110T. In one embodiment, the source eNB 110S determines that the UE 105 needs to be handed over to the target eNB 110T based on the measurement reports. The target eNB 110T responds to the source eNB 110S with a Handover Request Acknowledgment (HO Request Ack) message. The source eNB 110S, target eNB 110T, and the UE 105 communicate with each other to perform RRC reconfiguration and connection establishment (block 1205). The target eNB 110T sends a Path Switch Request to the MME 120. In one embodiment, the Path Switch Request includes the target eNB's S1 TEID information. The MME 120 selects a PPU 115 that can serve the UE 105 after handover (block 1210). In one embodiment, PPU 115 selection information is statically configured in the MME 120. For example, the MME 120 may store a mapping of eNBs 110 to PPUs 115 so that UEs 105 connecting via a particular eNB 110 will be assigned a serving PPU 115 based on the mapping of eNBs 110 to PPUs 115. In other embodiments, the eNB 110 can signal to the MME 120 a local PPU 115 that it supports. This information can then be used to store an eNB 110 to PPU 115 mapping. In this example, the MME 120 chooses the target PPU 115T to serve the UE 105 after handover. The MME 120 sends a Modify Bearer Request message to the target PPU 115T. In one embodiment, the Modify Bearer Request message includes the target eNB's S1 TEID information. The target PPU 115T determines a key for the relevant DRT entry based on the IP address and the APN associated with the IP session to be handed over (block 1215). The relevant DRT entry is an entry that provides routing information for reaching the IP session to be handed over. The target PPU 115T looks up the PPU responsible for storing the relevant DRT entry in the DHT based on the determined key (block 1220). In this example, the relevant DRT entry is stored at a remote PPU (i.e., the responsible PPU 115X). The target PPU 115T generates a TEID for the IP session to be handed over (block 1225). The TEID serves as a unique identifier that the target PPU 115T can use to identify the IP session to be handed over. The target PPU 115T generates a value that represents an IP address of the target PPU 115T and the generated TEID (block 1230). The target PPU 115T then causes the responsible PPU 115X to update the relevant DRT entry in the DHT with the generated value (block 1235). The target PPU 115T sends a Create Session Response message to the MME 120. In one embodiment, the Create Session Response message includes S1 SGW U-TEID and S1 SGW C-TEID information. The MME 120 sends a Path Switch Response message to the target eNB 110T. In one embodiment, the Path Switch Response message includes the S1 SGW-U TEID information. Then, handover continues as normal per legacy procedures (block 1240). As a result, the relevant DRT entry has been updated to indicate that the target PPU 115T now serves the IP session of the UE 105 (that was handed over) and that packets destined for that IP session should use the generated TEID.

Figure 13:
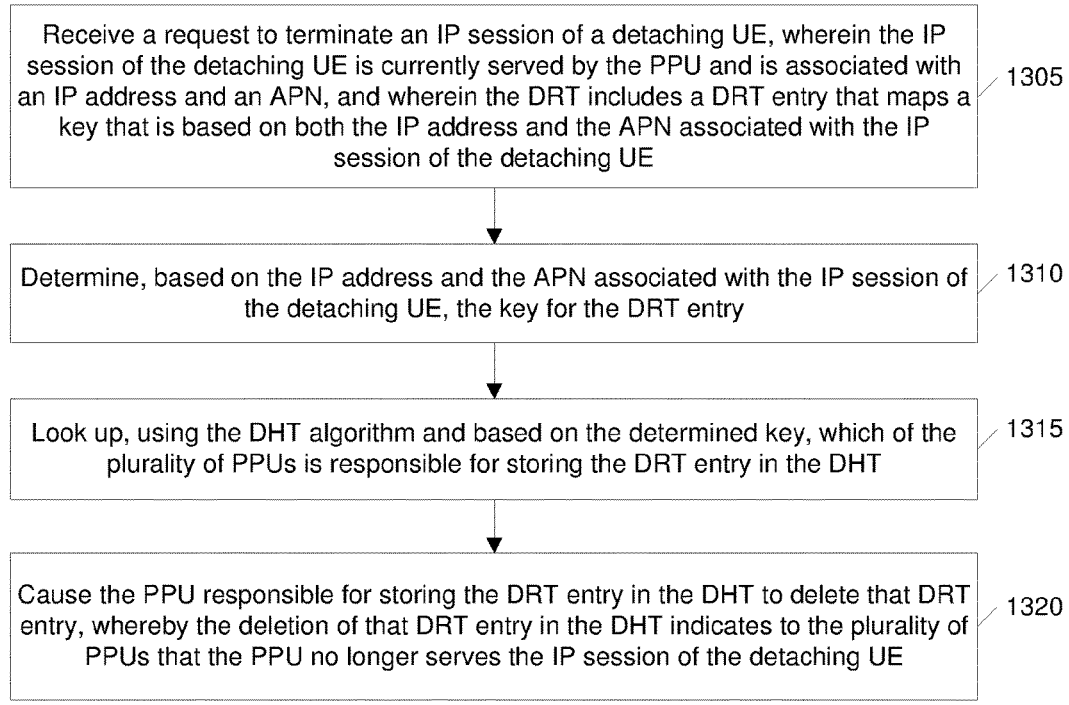
FIG. 13 is a flow diagram of one embodiment of a process for maintaining the DRT when a UE detaches from the EPC network.

FIG. 13 is a flow diagram of one embodiment of a process for maintaining the DRT when a UE detaches from the EPC network. The operations in the flow diagram may be performed by various components of a physical or virtual PPU.

In one embodiment, the process is initiated when a PPU 115 receives a request to terminate an IP session of a detaching UE 105 (block 1305). The IP session of the detaching UE 105 is currently served by the PPU 115 and is associated with an IP address and an APN, and a DRT includes a DRT entry that maps a key that is based on both the IP address and the APN associated with the IP session of the detaching UE 105. In one embodiment, the request to terminate the IP session of the detaching UE 105 is a Delete Session Request message from a MME (see 3GPP TS 23.401).

The PPU 115 determines, based on the IP address and the APN associated with the IP session of the detaching UE 105, the key for the DRT entry (block 1310). For example, for the exemplary routing table 150 illustrated in FIG. 2, the PPU 115 determines the key based on a combination of the APN and the IP address associated with the IP session of the detaching UE.

The PPU 115 looks up, using the DHT algorithm and based on the determined key, which of the plurality of PPUs 115 is responsible for storing the DRT entry in the DHT (block 1315). In one embodiment, the PPU 115 looks up which of the plurality of PPUs 115 is responsible for storing the DRT entry in the DHT based on calculating a hash value of the key, as previously described with reference to block 430. The PPU responsible for storing the DRT entry in the DHT could be a remote PPU or the PPU itself.

The PPU 115 then causes the PPU responsible for storing the DRT entry in the DHT to delete that DRT entry, whereby the deletion of that DRT entry in the DHT indicates to the plurality of PPUs 115 that the PPU 115 no longer serves the IP session of the detaching UE 105 (block 1320). If PPU 115 is the responsible PPU, then it deletes the DRT entry directly; otherwise, the PPU 115 transmits a message instructing deletion of the DRT entry to the remote PPU responsible for storing the DRT entry.

Figure 14:
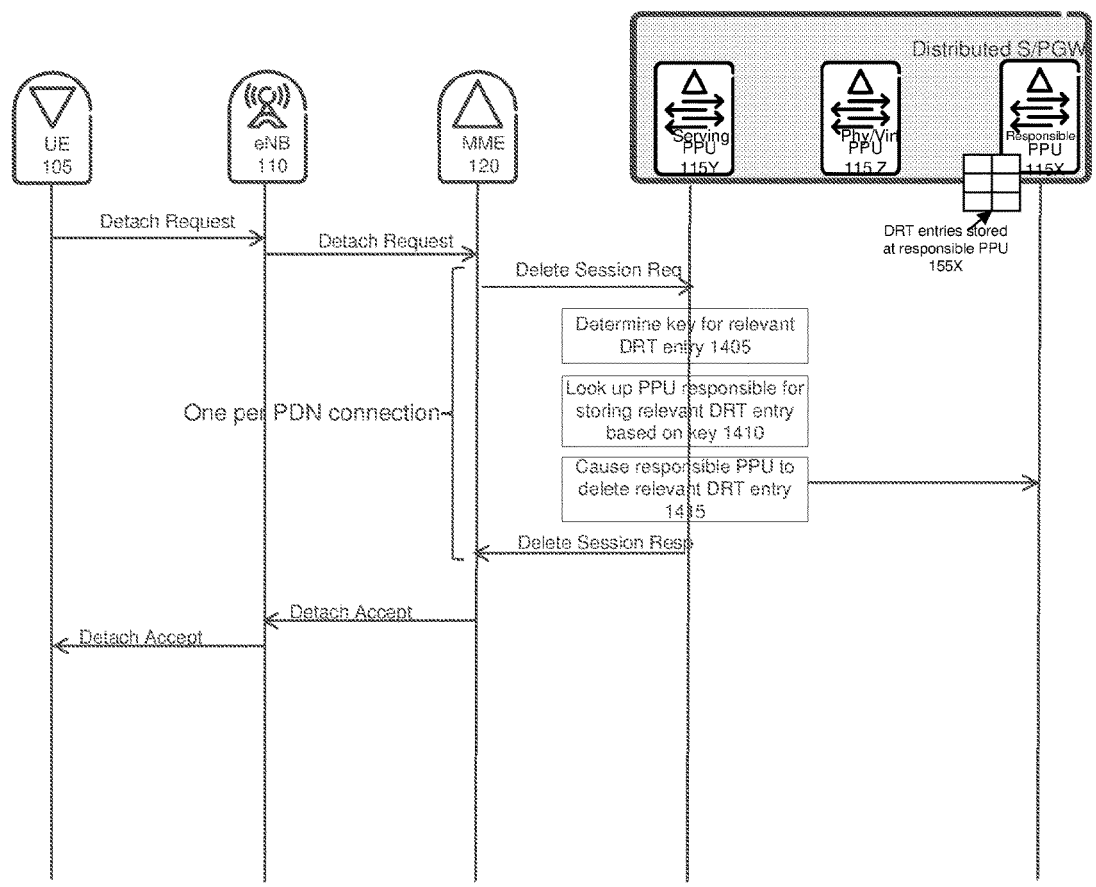
FIG. 14 is a transactional diagram of one embodiment of a UE detach process in an EPC network having a distributed S/PGW architecture, where the relevant DRT entry is stored in a remote PPU.

FIG. 14 is a transactional diagram of one embodiment of a UE detach process in an EPC network having a distributed S/PGW architecture, where the relevant DRT entry is stored in a remote PPU. In one embodiment, a UE 105 initiates the detach process by sending a Detach Request message to an MME 120. The MME 120 sends a Delete Session Request message to the PPU serving the UE 105 (i.e., serving PPU 115Y). In one embodiment, if the UE 105 is connected to more than one PDN, the MME 120 will send a Delete Session Request message to the serving PPU 115 for each PDN connection. The serving PPU 115Y then determines a key for the relevant DRT entry based on the IP address and APN associated with the IP session of the detaching UE 105 (block 1405). The relevant DRT entry is an entry that stores routing information for reaching the IP session of the detaching UE 105. The serving PPU 115Y looks up the PPU responsible for storing the relevant DRT entry in the DHT based on the determined key (block 1410). In this example, the relevant DRT entry is stored at a remote PPU (i.e., the responsible PPU 115X). The serving PPU 115Y then causes the responsible PPU 115X to delete the relevant DRT entry from the DHT (block 1415). The serving PPU 115Y sends a Delete Session Response message to the MME 120 and the MME 120 sends a Detach Accept message to the UE 105. As a result, the DRT has been updated to indicate that the serving PPU 115Y no longer serves the IP session of the detaching UE 105.

Figure 15A:
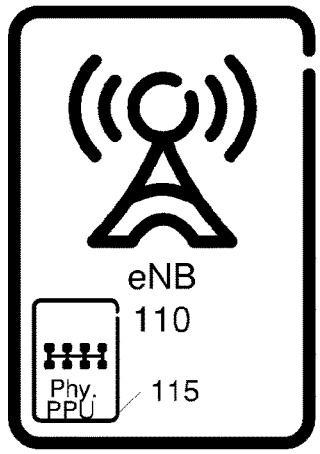
FIGS. 15A-D illustrate various implementation options for PPUs.
Figure 15B:
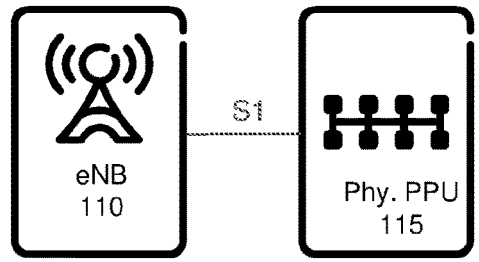
Figure 15C:
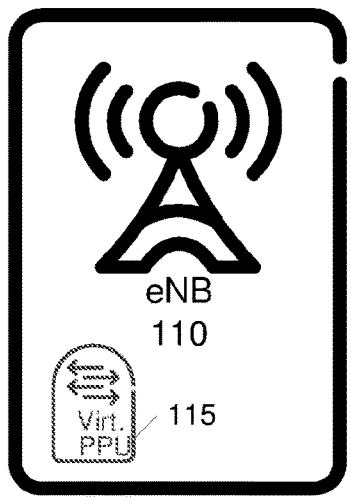
Figure 15D:
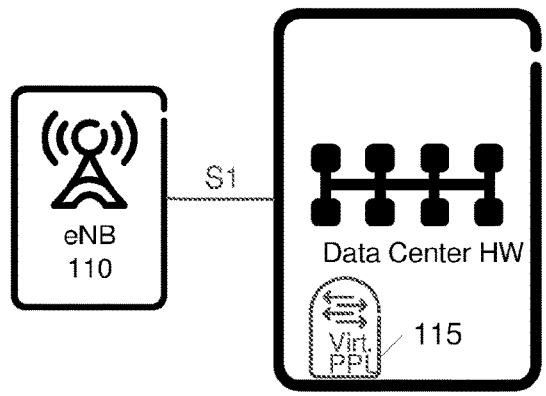

FIGS. 15A-D illustrate various implementation options for PPUs. In FIG. 15A, a physical PPU 115 is implemented in an eNB 110, for example as a processing blade. The eNB 110 and the physical PPU 115 are connected via an internal S1 interface. In FIG. 15B, a physical PPU 115 is implemented as a stand-alone device/box that is connected to an eNB 110 via an external S1 interface. In FIG. 15C, a virtual PPU 115 is implemented as a virtual machine running on a hypervisor (or as a software container), which is running on a processor and memory within an eNB 110. The eNB 110 and the virtual PPU 115 are connected via an internal S1 interface. In FIG. 15D, a virtual PPU 115 is implemented on general data center hardware or in a cloud platform (i.e., the virtual PPU 115 is implemented on a virtual machine running on a hypervisor (or as a software container), which is running on a processor and memory) connected to the eNB 110 via an external S1 interface.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) typically includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 16:
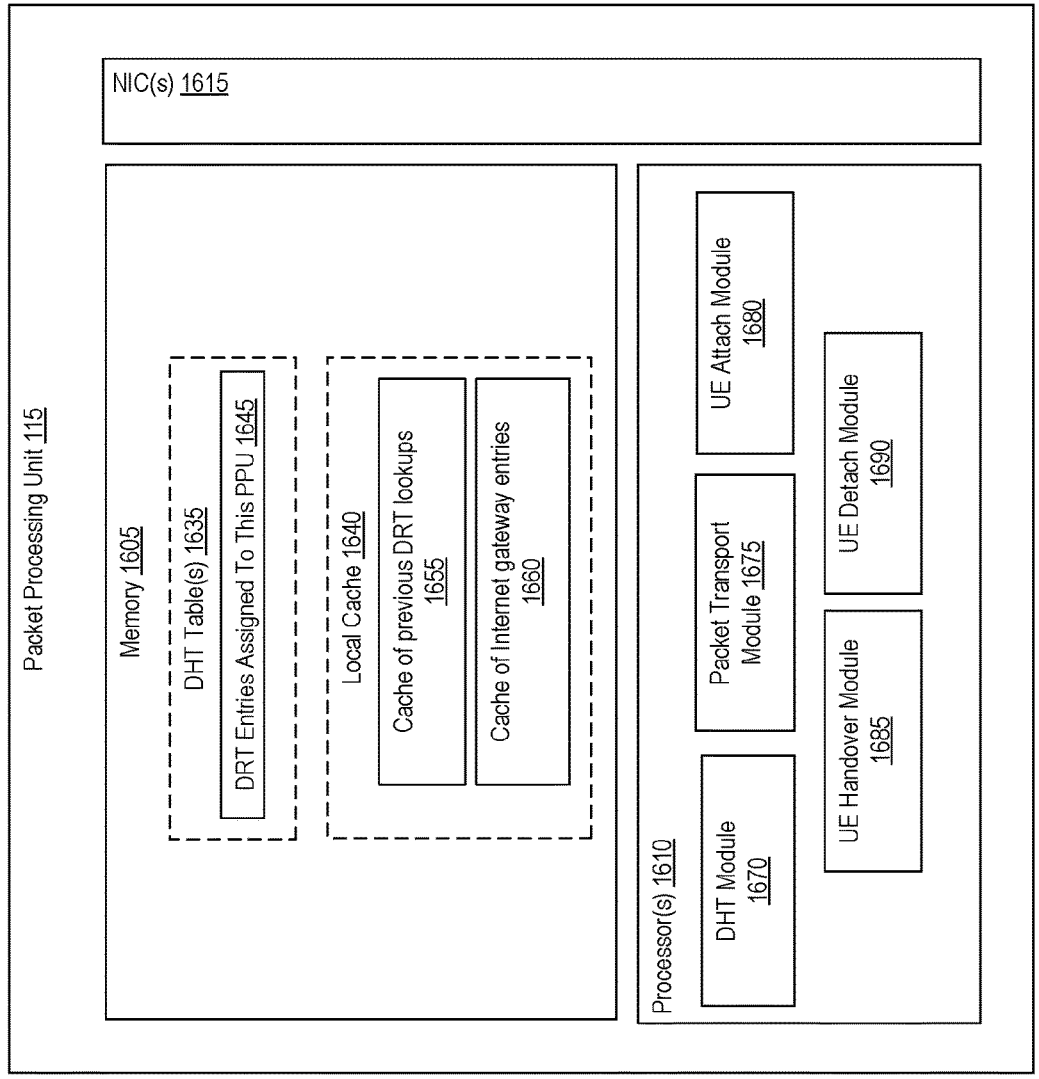
FIG. 16 is a diagram of one embodiment of a physical PPU that can implement routing in a communications network (e.g., an EPC network) having a distributed S/PGW architecture using a distributed routing table.

FIG. 16 is a diagram of one embodiment of a physical PPU that can implement routing in a communications network (e.g., an EPC network) having a distributed S/PGW architecture.

The physical (i.e., hardware) PPU 115 is a network device that can perform some or all of the operations and methods described above for one or more of the embodiments. The physical PPU 115 can include one or more network interface controllers (NICs; also known as network interface cards) 1615, processor(s) ("processor circuitry") 1610, memory 1605, a DHT module 1670, a packet transport module 1675, a UE attach module 1680, a UE handover module 1685, and a UE detach module 1690.

The processor(s) 1610 may include one or more data processing circuits, such as a general purpose and/or special purpose processor (e.g., microprocessor and/or digital signal processor). The processor(s) 1610 is configured to execute the DHT Module 1670, the packet transport module 1675, the UE attach module 1680, the UE handover module 1685, and the UE detach module 1690, to perform some or all of the operations and methods described above for one or more of the embodiments. The DHT module 1670, when executed by the processor 1610 may create a DHT table 1635 in the memory 1605 to store DRT entries assigned to the PPU 1645. The packet transport module 1675, when executed by the processor 1610, may create a local cache 1640 in the memory 1605 to store a cache of previous DRT lookups 1665 and a cache of Internet gateway entries 1660. Although the various modules of FIG. 16 are shown to be included as part of the processor 1610, one having ordinary skill in the art will appreciate that the various modules may be stored separately from the processor 1610, for example, in a non-transitory computer readable storage medium. The processor 1610 can execute the various modules stored in the non-transitory computer readable medium, to perform some or all of the operations and methods described above. Accordingly, the processor 1610 can be configured by execution of various modules to carry out some or all of the functionality disclosed herein.

Figure 17:
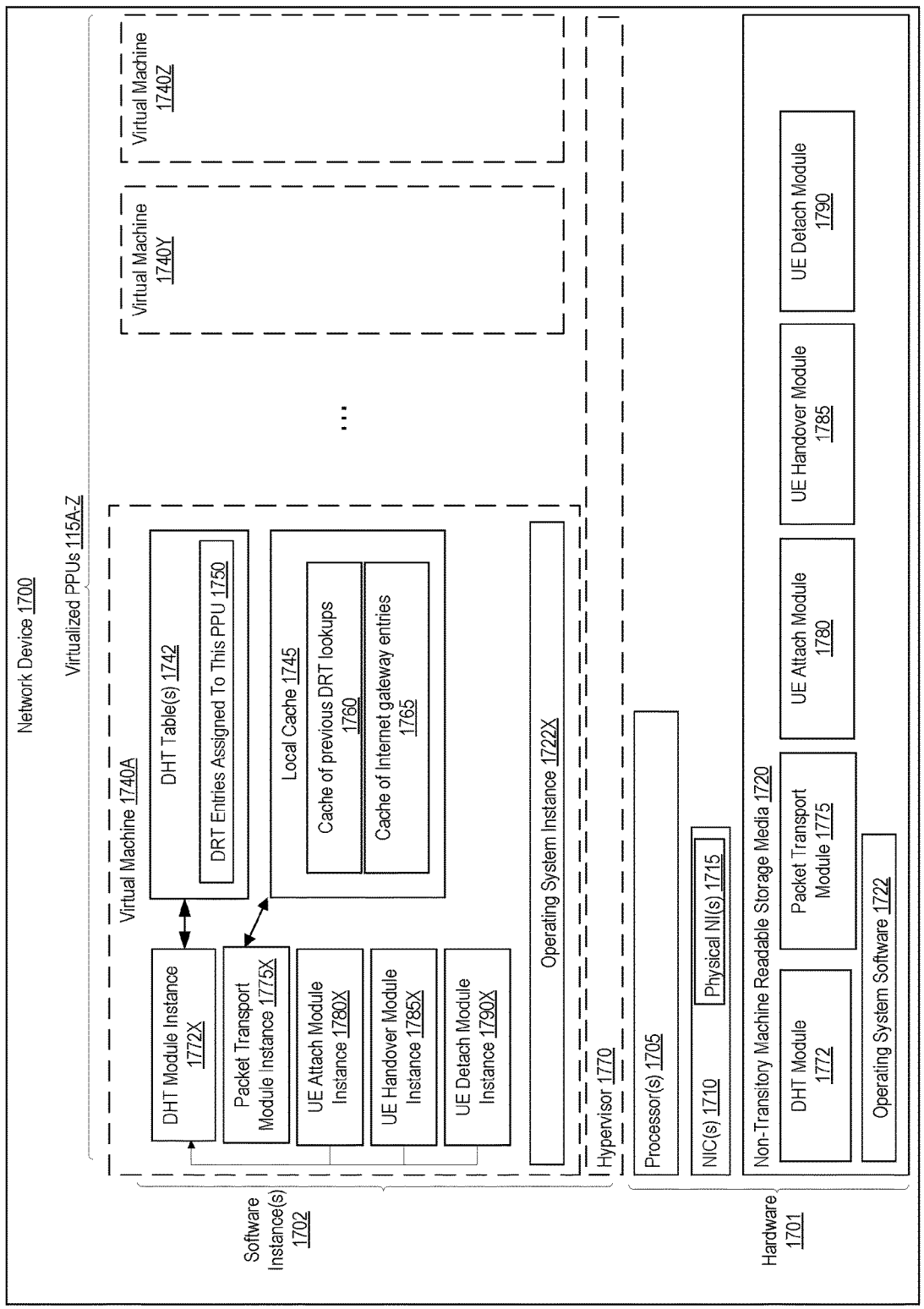
FIG. 17 is a diagram of one embodiment of a network device that can implement one or more virtual PPUs that can implement routing in a communications network (e.g., an EPC network) having a distributed S/PGW architecture using a distributed routing table.

FIG. 17 is a diagram of one embodiment of a network device that can implement one or more virtual PPUs that can implement routing in a communications network (e.g., an EPC network) having a distributed S/PGW architecture.

The network device 1700 includes hardware 1701 comprising a set of one or more processor(s) 1705 (which are often commercial off-the-shelf COTS processors) and NIC(s) 1710 (which include physical NIs 1715), as well as non-transitory machine readable storage media 1720 having stored therein a DHT module 1772, a packet transport module 1775, a UE attach module 1780, a UE handover module 1785, a UE detach module 1790, and operating system (OS) software 1722. A physical NI 1715 is hardware in a network device 1700 through which a network connection (e.g., wirelessly through a wireless network interface controller (WNIC) or through plugging in a cable to a physical port connected to a NIC 1710) is made. During operation, the processor(s) 1705 may execute software to instantiate a hypervisor 1770 (sometimes referred to as a virtual machine monitor (VMM)) and one or more virtual machines 1740A-Z that are run by the hypervisor 1770, which are collectively referred to as software instance(s) 1702. A virtual machine 1740 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1740A-Z, and that part of the hardware 1701 that executes that virtual machine (be it hardware dedicated to that virtual machine and/or time slices of hardware temporally shared by that virtual machine with others of the virtual machine(s)), may form a separate virtual PPU.

Each such virtual PPU can include a DHT module instance 1772X, a packet transport module instance 1775X, a UE attach module instance 1780X, a UE handover module instance 1785X, and a UE detach module instance 1790X. The DHT module instance 1772X, when executed, may create a DHT table 1742 in the memory of the virtual machine 1740A to store DRT entries assigned to the virtual PPU 1750. The packet transport module instance 1775X, when executed, may create a local cache 1745 in the memory of the virtual machine 1740A to store a cache of previous DRT lookups 1760 and a cache of Internet gateway entries 1765.

A virtual PPU performs similar functionality to the PPU 115 illustrated in FIG. 16. For instance, the hypervisor 1770 may present a virtual operating platform that appears like networking hardware to virtual machine 1740, and the virtual machine 1740 may be used to implement functionality of the DHT module 1772, packet transport module 1775, UE attach module 1780, UE handover module 1785, and UE detach module 1790 (this virtualization of the hardware is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While one embodiment implements virtualization with the hypervisor 1770 and virtual machines 1740A-Z, alternative embodiments may use other techniques (e.g., using operating system level virtualization where, instead of a hypervisor and virtual machines, the kernel of the operating system allows for multiple user space instances (often called software containers, virtualization engines, virtual private servers, or jails) that may execute a virtualized PPU.

An advantage provided by the processes described herein above is that it allows PPUs to route data packets in a communications network (e.g., an EPC network) having a distributed S/PGW architecture. PPUs that join to participate as a node in the DHT can route packets for UEs that it serves, and thus provide local termination of data. Moreover, if a PPU fails, or otherwise becomes unavailable, another PPU can automatically take over the failed PPU's responsibilities (i.e., maintenance of DRT entries in the DHT). This self-healing and self-configurable aspect allows the possibility to add user plane capacity and local termination capabilities of data packets by adding and/or moving PPUs in the core network in a plug-and-play fashion.

Thus, a method, system, and apparatus for supporting routing in a communications network having a distributed S/PGW architecture has been described. While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. Many variations and modifications can be made to the embodiments without substantially departing from the principles of the present invention. All such variations and modifications are intended to be included herein within the scope of the present invention.

The invention claimed is:

1. A non-transitory computer readable medium having stored therein instructions to be executed by a packet processing unit (PPU) in a communications network to allow a plurality of PPUs in the communications network to route data packets, the instructions when executed by the PPU cause the PPU to perform a set of operations comprising:

receiving a data packet addressed to a destination Internet Protocol (IP) address and an access point name (APN) associated with an IP session of a user entity (UE), wherein the plurality of PPUs in the communications network collectively maintain a distributed hash table (DHT) storing a distributed routing table (DRT), wherein the DRT includes a DRT entry that maps a key to a value, wherein the key of the DRT entry is based on both the destination IP address and the APN associated with the IP session of the UE, wherein the value of the DRT entry represents both an IP address of one of the plurality of PPUs currently serving the IP session of the UE and an IP session identifier that identifies, to that PPU currently serving the IP session of the UE, the IP session of the UE;

determining, based on the destination IP address and the APN associated with the IP session of the UE, the key for the DRT entry;

looking up, using a DHT algorithm and based on the determined key, which of the plurality of PPUs is responsible for storing the DRT entry in the DHT;

accessing, from the PPU responsible for storing the DRT entry in the DHT, the value of the DRT entry; and tunneling the data packet to the IP address of the PPU currently serving the IP session of the UE using the IP session identifier based on the value.

2. The non-transitory computer readable medium of claim 1, wherein the instructions when executed by the PPU cause the PPU to perform a further set of operations comprising:

inserting, into a local cache of previous DRT lookups, an entry that maps the key to the value.

3. The non-transitory computer readable medium of claim 1, wherein the instructions when executed by the PPU cause the PPU to perform a further set of operations comprising:

checking that a local cache of previous DRT lookups does not include an entry that maps the key before the accessing, from the PPU responsible for storing the DRT entry in the DHT, the value of the DRT entry.

4. The non-transitory computer readable medium of claim 1, wherein the PPU responsible for storing the DRT entry in the DHT is the PPU itself.

5. The non-transitory computer readable medium of claim 1, wherein the tunneling of the data packet is performed using a GPRS Tunneling Protocol (GTP).

6. The non-transitory computer readable medium of claim 1, wherein the instructions when executed by the PPU cause the PPU to perform a further set of operations comprising:

receiving another data packet addressed to another destination IP address and another APN that is outside of a range of IP addresses that are local to the communications network, wherein the DRT includes another DRT entry that maps another key to another value, wherein the another key of the another DRT entry is based on both an identifier that represents IP addresses outside of the range of IP addresses that are local to the communications network and the another APN, wherein the another value of the another DRT entry represents both an IP address of one of the plurality of PPUs with peering to a packet data network (PDN) associated with the another APN and a default IP session identifier for the another APN that identifies, to that PPU with peering to the PDN, the PDN associated with the another APN;

determining, based on the another destination IP address and the another APN, the another key for the another DRT entry;

looking up, using the DHT algorithm and based on the determined another key, which of the plurality of PPUs is responsible for storing the another DRT entry in the DHT;

accessing, from the PPU responsible for storing the another DRT entry in the DHT, the another value of the another DRT entry; and tunneling the data packet to the IP address of the PPU with peering to the PDN using the default IP session identifier for the PDN based on the another value.

7. The non-transitory computer readable medium of claim 6, wherein the instructions when executed by the PPU cause the PPU to perform a further set of operations comprising:
inserting, into a local cache of Internet gateway entries, an entry that maps the another key to the another value.

8. The non-transitory computer readable medium of claim 1, wherein the instructions when executed by the PPU cause the PPU to perform a further set of operations comprising:
receiving a data packet that is tunneled to the PPU using an IP session identifier;
identifying an IP session of a UE or a PDN coupled to the PPU that is associated with the IP session identifier used by the tunneled data packet; and
routing the tunneled data packet to the identified IP session of the UE or to the identified PDN.

9. The non-transitory computer readable medium of claim 1, wherein the instructions when executed by the PPU cause the PPU to perform a further set of operations comprising:
receiving a request to create an IP session for an attaching UE, wherein the request includes a requested APN;
causing an IP address associated with the requested APN to be allocated to the IP session of the attaching UE;
generating an IP session identifier that uniquely identifies, to the PPU, the IP session of the attaching UE;
generating another key based on the allocated IP address and the requested APN of the IP session of the attaching UE;
generating another value that represents an IP address of the PPU and the generated IP session identifier;
looking up, using the DHT algorithm and based on the generated another key, which of the plurality of PPUs is to be responsible for storing a new DRT entry in the DHT that maps the generated another key to the generated another value; and
causing the responsible PPU to store the new DRT entry in the DHT, wherein the storing of that new DRT entry in the DHT indicates to the plurality of PPUs that packets destined for the IP session of the attaching UE should be tunneled to the IP address of the PPU using the generated IP session identifier.

10. The non-transitory computer readable medium of claim 9, wherein the request to create the IP session is a Create Session Request message from a Mobility Management Entity (MME).

11. The non-transitory computer readable medium of claim 1, wherein the instructions when executed by the PPU cause the PPU to perform a further set of operations comprising:
receiving a message indicating that an IP session of a UE is to be handed over to the PPU, wherein the IP session to be handed over is associated with an IP address and an APN, and wherein the DRT includes another DRT entry that maps another key that is based on both the IP address and the APN associated with the IP session to be handed over;
determining, based on the IP address and the APN associated with the IP session to be handed over, the another key for the another DRT entry;
looking up, using the DHT algorithm and based on the determined another key, which of the plurality of PPUs is responsible for storing the another DRT entry in the DHT;
generating an IP session identifier that uniquely identifies to the PPU, the IP session to be handed over;
generating another value that represents an IP address of the PPU and the generated IP session identifier; and
causing the PPU responsible for storing the another DRT entry in the DHT to update that another DRT entry to map the another key to the generated another value, wherein the update of that another DRT entry in the DHT indicates to the plurality of PPUs that packets destined for the IP session to be handed over should now be tunneled to the IP address of the PPU using the generated IP session identifier.

12. The non-transitory computer readable medium of claim 11, wherein the message indicating that the IP session of the UE is to be handed over to the PPU is a Modify Bearer Request message from an MME.

13. The non-transitory computer readable medium of claim 1, wherein the instructions when executed by the PPU cause the PPU to perform a further set of operations comprising:
receiving a request to terminate an IP session of a detaching UE, wherein the IP session of the detaching UE is currently served by the PPU and is associated with an IP address and an APN, and wherein the DRT includes another DRT entry that maps another key that is based on both the IP address and the APN associated with the IP session of the detaching UE;
determining, based on the IP address and the APN associated with the IP session of the detaching UE, the another key for the another DRT entry;
looking up, using the DHT algorithm and based on the determined another key, which of the plurality of PPUs is responsible for storing the another DRT entry in the DHT; and
causing the PPU responsible for storing the another DRT entry in the DHT to delete that another DRT entry, wherein the deletion of that another DRT entry in the DHT indicates to the plurality of PPUs that the PPU no longer serves the IP session of the detaching UE.

14. The non-transitory computer readable medium of claim 13, wherein the request to terminate the IP session of the detaching UE is a Delete Session Request message from an MME.

15. The non-transitory computer readable medium of claim 1, wherein the DHT stores different entries of the DHT at different ones of the PPUs maintaining the DHT based on proximity of a hash value of the key for the different ones of the entries to an identifier for the different ones of the PPUs according to a distance metric.

16. The non-transitory computer readable medium of claim 1, wherein the DHT is implemented using any one of a Chord DHT algorithm, a Pastry DHT algorithm, and a Kademlia DHT algorithm.

17. The non-transitory computer readable medium of claim 1, wherein the IP session identifier is a tunnel endpoint identifier (TEID).

18. A method by a Packet Processing Unit (PPU) in a communications network to allow a plurality of PPUs in the communications network to route data packets, the method comprising:
receiving a data packet addressed to a destination Internet Protocol (IP) address and an access point name (APN) associated with an IP session of a user entity (UE), wherein the plurality of PPUs in the communications network collectively maintain a distributed hash table (DHT) storing a distributed routing table (DRT), wherein the DRT includes a DRT entry that maps a key to a value, wherein the key of the DRT entry is based on both the destination IP address and the APN associated with the IP session of the UE, wherein the value of the DRT entry represents both an IP address of one of the plurality of PPUs currently serving the IP session of the UE and an IP session identifier that identifies, to that PPU currently serving the IP session of the UE, the IP session of the UE;

determining, based on the destination IP address and the APN associated with the IP session of the UE, the key for the DRT entry;

looking up, using a DHT algorithm and based on the determined key, which of the plurality of PPUs is responsible for storing the DRT entry in the DHT;

accessing, from the PPU responsible for storing the DRT entry in the DHT, the value of the DRT entry; and tunneling the data packet to the IP address of the PPU currently serving the IP session of the UE using the IP session identifier based on the value.

19. The method of claim 18, further comprising:

receiving a request to create an IP session for an attaching UE, wherein the request includes a requested APN;

causing an IP address associated with the requested APN to be allocated to the IP session of the attaching UE;

generating an IP session identifier that uniquely identifies, to the PPU, the IP session of the attaching UE;

generating another key based on the allocated IP address and the requested APN of the IP session of the attaching UE;

generating another value that represents an IP address of the PPU and the generated IP session identifier;

looking up, using the DHT algorithm and based on the generated another key, which of the plurality of PPUs is to be responsible for storing a new DRT entry in the DHT that maps the generated another key to the generated another value; and causing the responsible PPU to store the new DRT entry in the DHT, wherein the storing of that new DRT entry in the DHT indicates to the plurality of PPUs that packets destined for the IP session of the attaching UE should be tunneled to the IP address of the PPU using the generated IP session identifier.

20. A network device to function as a Packet Processing Unit (PPU) in a communications network to allow a plurality of PPUs in the communications network to route data packets, the network device comprising:

a set of one or more processors; and a memory containing instructions, which when executed by the set of one or more processors, cause the network device to:

receive a data packet addressed to a destination Internet Protocol (IP) address and an access point name (APN) associated with an IP session of a user entity (UE), wherein the plurality of PPUs in the communication networks are to collectively maintain a distributed hash table (DHT) storing a distributed routing table (DRT), wherein the DRT includes a DRT entry that maps a key to a value, wherein the key of the DRT entry is based on both the destination IP address and the APN associated with the IP session of the UE, wherein the value of the DRT entry represents both an IP address of one of the plurality of PPUs currently serving the IP session of the UE and an IP session identifier that identifies, to that PPU currently serving the IP session of the UE, the IP session of the UE;

determine, based on the destination IP address and the APN associated with the IP session of the UE, the key for the DRT entry, look up, using a DHT algorithm and based on the determined key, which of the plurality of PPUs is responsible for storing the DRT entry in the DHT, access, from the PPU responsible for storing the DRT entry in the DHT, the value of the DRT entry, and tunnel the data packet to the IP address of the PPU currently serving the IP session of the UE using the IP session identifier based on the value.

21. The network device of claim 20, wherein the memory contains further instructions, which when executed by the set of one or more processors, cause the network device to:

receive a request to create an IP session for an attaching UE, wherein the request includes a requested APN, cause an IP address associated with the requested APN to be allocated to the IP session of the attaching UE, generate an IP session identifier that uniquely identifies, to the PPU, the IP session of the attaching UE, generate another key based on the allocated IP address and the requested APN of the IP session of the attaching UE, generate another value that represents an IP address of the PPU and the generated IP session identifier, look up, using the DHT algorithm and based on the generated another key, which of the plurality of PPUs is to be responsible for storing a new DRT entry in the DHT that maps the generated another key to the generated another value, and cause the responsible PPU to store the new DRT entry in the DHT, wherein the storing of that new DRT entry in the DHT indicates to the plurality of PPUs that packets destined for the IP session of the attaching UE should be tunneled to the IP address of the PPU using the generated IP session identifier.

* * * * *